United States Patent
Rudy et al.

(10) Patent No.: US 10,544,012 B2
(45) Date of Patent: Jan. 28, 2020

(54) VISUAL OUTRIGGER MONITORING SYSTEM

(71) Applicant: Manitowoc Crane Companies, LLC, Manitowoc, WI (US)

(72) Inventors: John Rudy, Greencastle, PA (US); Matthew Thoresen, Chambersburg, PA (US)

(73) Assignee: Manitowoc Crane Companies, LLC, Milwaukee, WI (US)

(*) Notice: Subject to any disclaimer, the term of this patent is extended or adjusted under 35 U.S.C. 154(b) by 124 days.

(21) Appl. No.: 15/416,817

(22) Filed: Jan. 26, 2017

(65) Prior Publication Data
US 2017/0217737 A1    Aug. 3, 2017

Related U.S. Application Data

(60) Provisional application No. 62/288,777, filed on Jan. 29, 2016.

(51) Int. Cl.
*B66C 13/46* (2006.01)
*B66C 13/16* (2006.01)
(Continued)

(52) U.S. Cl.
CPC .............. *B66C 13/16* (2013.01); *B66C 23/78* (2013.01); *G06T 7/0004* (2013.01); *G06T 7/13* (2017.01);
(Continued)

(58) Field of Classification Search
CPC ......... B66C 13/46; B66C 13/48; B66C 23/72; B66C 23/78; B66C 23/84
(Continued)

(56) References Cited

U.S. PATENT DOCUMENTS

| 4,216,868 A | 8/1980 | Geppert |
| 4,577,344 A | 3/1986 | Warren et al. |

(Continued)

FOREIGN PATENT DOCUMENTS

| AU | 637377 B | 10/1993 |
| AU | 2015372216 A1 | 7/2016 |

(Continued)

OTHER PUBLICATIONS

Extended European Search Report issued by EPO in connection with EP17203098 dated Apr. 17, 2018.
(Continued)

*Primary Examiner* — Kevin K Pyo
(74) *Attorney, Agent, or Firm* — Levenfeld Pearlstein, LLC

(57) ABSTRACT

A system and method for visually monitoring an outrigger includes a camera assembly configured to monitor an outrigger and a control system operably and communicably connected to the camera assembly. The control system executes instructions to determine a presence, length, and/or position of the outrigger based by an image captured by the camera assembly. The outrigger may include a target to be detected by the camera assembly for monitoring of the outrigger. The target may be the outrigger itself, detected by the control system using edge detection, or a marker disposed on the outrigger. The system may be implemented with a crane having a carrier unit and a superstructure. The system may include a plurality of camera assemblies and a plurality of outriggers.

18 Claims, 18 Drawing Sheets

(51) Int. Cl.
*G06T 7/246* (2017.01)
*G06T 7/13* (2017.01)
*B66C 23/78* (2006.01)
*G06T 7/00* (2017.01)
*H04N 5/225* (2006.01)

(52) U.S. Cl.
CPC ........... *G06T 7/246* (2017.01); *H04N 5/2252* (2013.01); *G06T 2207/30108* (2013.01)

(58) Field of Classification Search
USPC ..................... 250/221, 559.29; 212/276, 277
See application file for complete search history.

(56) References Cited

U.S. PATENT DOCUMENTS

| | | |
|---|---|---|
| 4,826,391 A | 5/1989 | Lawrence et al. |
| 4,907,768 A | 3/1990 | Masseron et al. |
| 5,251,768 A | 10/1993 | Yoshimatsu et al. |
| 5,392,935 A | 2/1995 | Kazama et al. |
| 5,642,822 A | 7/1997 | Monzen et al. |
| 5,645,181 A | 7/1997 | Ichiba et al. |
| 5,726,907 A | 5/1998 | Davidson et al. |
| 5,967,347 A | 10/1999 | Miyata et al. |
| 6,065,619 A | 5/2000 | Miyata et al. |
| 6,140,930 A | 10/2000 | Shaw |
| 6,170,681 B1 * | 1/2001 | Yoshimatsu ......... B66C 23/905 212/278 |
| 6,182,843 B1 | 2/2001 | Tax et al. |
| 6,256,553 B1 | 7/2001 | Erikkila |
| 6,554,144 B2 | 4/2003 | Hashiguchi et al. |
| 6,568,547 B1 | 5/2003 | Kretschmer et al. |
| 6,588,610 B2 | 7/2003 | Ong et al. |
| 6,634,112 B2 | 10/2003 | Carr et al. |
| 6,718,048 B1 | 4/2004 | Kawata et al. |
| 6,748,104 B1 | 6/2004 | Bachelder et al. |
| 6,765,224 B1 | 7/2004 | Favreau et al. |
| 6,894,621 B2 | 5/2005 | Shaw |
| 7,106,883 B2 | 9/2006 | Uchida et al. |
| 7,121,012 B2 | 10/2006 | Voecks |
| 7,289,875 B2 | 10/2007 | Recktenwald et al. |
| 7,289,876 B2 | 10/2007 | Lussen et al. |
| 7,310,431 B2 | 12/2007 | Gokturk et al. |
| 7,472,009 B2 | 12/2008 | Baldwin |
| 7,599,762 B2 | 10/2009 | Discenzo et al. |
| 7,648,036 B2 | 1/2010 | Recktenwald et al. |
| 7,656,459 B2 | 2/2010 | Catanzaro |
| 7,936,143 B2 | 5/2011 | Ikeguchi et al. |
| 7,950,539 B2 | 5/2011 | Henriksson |
| 8,005,598 B2 | 8/2011 | Terashima et al. |
| 8,267,264 B2 | 9/2012 | Bryfors et al. |
| 8,272,521 B1 | 9/2012 | Kemmerly et al. |
| 8,385,594 B2 | 2/2013 | Hofmann et al. |
| 8,504,253 B2 | 8/2013 | Stantchev et al. |
| 8,618,949 B2 | 12/2013 | Maynard et al. |
| 8,659,408 B2 | 2/2014 | Taylor et al. |
| 8,682,541 B2 | 3/2014 | Best et al. |
| 8,937,651 B2 | 1/2015 | Guissin et al. |
| 9,156,663 B2 | 10/2015 | Roeben et al. |
| 9,278,834 B2 | 3/2016 | Pech et al. |
| 9,300,954 B2 | 3/2016 | Tanizumi et al. |
| 9,335,318 B2 | 5/2016 | Ilaka et al. |
| 9,394,146 B2 | 7/2016 | Schroder |
| 9,440,824 B2 | 9/2016 | Stuehrwoldt et al. |
| 9,556,006 B2 | 1/2017 | Schneider et al. |
| 2003/0137590 A1 | 7/2003 | Barnes et al. |
| 2003/0161524 A1 | 8/2003 | King |
| 2005/0226584 A1 | 10/2005 | Williams et al. |
| 2005/0232626 A1 | 10/2005 | Schulte et al. |
| 2005/0256797 A1 | 11/2005 | Tyulyaev |
| 2010/0070179 A1 | 3/2010 | Cameron |
| 2010/0277298 A1 | 11/2010 | Leong et al. |
| 2011/0031202 A1 | 2/2011 | Pech et al. |
| 2011/0140419 A1 | 6/2011 | Stockner |
| 2011/0187548 A1 | 8/2011 | Maynard et al. |
| 2011/0272376 A1 | 11/2011 | Jung et al. |
| 2013/0013251 A1 | 1/2013 | Schoonmaker et al. |
| 2013/0119256 A1 | 5/2013 | Husmann et al. |
| 2013/0345857 A1 | 12/2013 | Lee et al. |
| 2014/0224755 A1 | 8/2014 | Eriksson et al. |
| 2015/0122761 A1 | 5/2015 | Ford et al. |
| 2015/0142277 A1 | 5/2015 | Eriksson et al. |
| 2015/0256797 A1 | 9/2015 | Torben |
| 2015/0329333 A1 | 11/2015 | Fenker et al. |
| 2016/0006947 A1 | 1/2016 | Kowatari et al. |
| 2016/0016763 A1 | 1/2016 | Lee et al. |
| 2016/0031681 A1 | 2/2016 | Delplace |
| 2016/0107866 A1 | 4/2016 | Schoonmaker et al. |
| 2016/0119589 A1 | 4/2016 | Tanizumi et al. |
| 2016/0176686 A1 | 6/2016 | Schoonmaker |
| 2016/0236913 A1 | 8/2016 | Ilaka et al. |
| 2018/0072540 A1 | 3/2018 | Stangl |
| 2018/0141787 A1 | 5/2018 | Rudy et al. |
| 2018/0143011 A1 | 5/2018 | Rudy et al. |

FOREIGN PATENT DOCUMENTS

| | | |
|---|---|---|
| CN | 2154484 Y | 1/1994 |
| CN | 102193559 A | 9/2011 |
| CN | 102661952 A | 9/2012 |
| CN | 102795547 A | 11/2012 |
| CN | 203319435 U | 12/2013 |
| CN | 102756976 B | 7/2014 |
| CN | 104477723 A | 4/2015 |
| CN | 104535356 A | 4/2015 |
| DE | 102006046469 A1 | 4/2008 |
| DE | 102013008348 A1 | 11/2014 |
| DE | 102014018063 A1 | 6/2016 |
| EP | 2383566 A1 | 11/2011 |
| EP | 2722302 A1 | 4/2014 |
| EP | 2914540 B1 | 9/2015 |
| EP | 2899496 A1 | 8/2016 |
| JP | 2056397 A | 2/1990 |
| JP | H0256397 A | 2/1990 |
| JP | 2003300692 A | 10/2003 |
| JP | 2008074594 A | 4/2008 |
| JP | 2009073248 A | 4/2009 |
| JP | 2010241548 A | 10/2010 |
| JP | 2013120176 A | 6/2013 |
| JP | 2013193825 A | 9/2013 |
| JP | 2015229582 A | 12/2015 |
| JP | 2016166086 A | 9/2016 |
| JP | 2016166091 A | 9/2016 |
| JP | 2017186163 A | 10/2017 |
| JP | 2017186164 A | 10/2017 |
| JP | 2017186165 A | 10/2017 |
| WO | 9119665 A1 | 2/1991 |
| WO | 1999008956 A1 | 2/1999 |
| WO | 2004080882 A1 | 9/2004 |
| WO | 2009047719 A2 | 4/2009 |
| WO | 2013059599 A1 | 4/2013 |
| WO | 2014019132 A1 | 2/2014 |
| WO | 2014047840 A1 | 4/2014 |
| WO | 2016101500 A1 | 6/2016 |
| WO | 2017067651 A1 | 4/2017 |
| WO | 2017159321 A1 | 9/2017 |

OTHER PUBLICATIONS

Extended European Search Report issued by EPO in connection with EP17203102 dated Apr. 18, 2018.
Extended European Search Report issued by EPO in connection with EP17203093 dated Apr. 18, 2018.
Extended European Search Report issued by EPO in connection with EP17203109 dated May 4, 2018.
European Search Report issued by ISA/EPO in connection with EP17153446 dated Jul. 7, 2017.
"360 degree vehicle camera systems", https://www.vdo-instruments.com/camera-systems/360-degree-vehicle-camera-systems.html, captured Oct. 9, 2017.
"ProViu ASL 360", http://www.asl360.co.uk/products/, captured Oct. 9, 2017.

(56) References Cited

OTHER PUBLICATIONS

Vallan A, Molinari F. A vision-based technique for lay length measurement of metallic wire ropes. IEEE Trans Instrum Meas 2009; 58. (Year: 2009).

* cited by examiner

VISUAL OUTRIGGER MONITORING SYSTEM

BACKGROUND

The present invention relates to a crane monitoring system, and more particularly to a visual system for monitoring outriggers, other crane components and an area surrounding the crane.

Mobile cranes typically include a carrier unit in the form of a transport chassis and a superstructure unit having an extendable boom. The superstructure unit is typically rotatable upon the carrier unit. In transport the crane is supported by the carrier unit on its axles and tires.

At times, the mobile crane needs to be stabilized beyond what can be provided while resting on the tires and axles of the transport chassis. In order to provide stability and support of the crane during lifting operations, it is well known to provide the carrier unit with an outrigger system. An outrigger system will normally include at least two (often four or more) outriggers for supporting the mobile crane. The outrigger system may include telescoping outrigger beams with outrigger jacks and outrigger pads for supporting the mobile crane when the crane is located in a position at which it will perform lifting tasks.

Utilizing the telescoping outrigger beams, the outrigger pads may be extended to lateral locations at which they will provide a stabilizing base for the crane. Once positioned, the outrigger jacks are extended, lowering the outrigger pads into contact with the ground in order to support and stabilize the carrier unit and the superstructure unit. The outrigger jacks may be extended sufficiently, if desired, so as to support the crane in a manner such that the tires are elevated above the ground.

Historically, a crane operator would determine the degree to which the telescoping outrigger beams should be extended to properly stabilize a crane, and manually inspect the outriggers to determine if the outrigger pads were in position and contacting the ground. More recently, outrigger monitoring systems have been developed to assist an operator. These systems typically rely on measurement devices such as string potentiometers, proximity sensors, laser sensors, and other distance sensors. While each of the aforementioned systems is able to determine the extension of the outriggers, it would be beneficial to develop a low cost, reliable system to visually monitor the outriggers, including the extension of the outriggers.

BRIEF SUMMARY

According to one aspect, there is provided an outrigger monitoring system having a camera assembly configured to monitor a length of an outrigger and a control system operably and communicably connected to the camera assembly. The control system includes a processor and computer readable storage media in communication with the processor, the computer readable storage media storing instructions, that when executed by the processor cause the control system to implement functions including an image recognition function configured to receive an image of the outrigger from the camera assembly and determine the length of the outrigger based on the received image.

In some embodiments, the camera assembly may detect at least one target. The at least one target may be an outrigger jack. In some embodiments, the at least one target may be an optical pattern or marking on an outrigger. In some embodiments, the target is a high contrast color.

In some embodiments, the functions further include a motion detection function configured to detect motion in the field of view of the camera. In some embodiments, the functions further include a pattern recognition function configured to recognize a pattern on an outrigger. In some embodiments, the functions further include an obstacle detection function configured to monitor an area around the outrigger for potential obstacles.

In some embodiments, the system includes a plurality of outriggers and at least one camera assembly for each outrigger of the plurality of outriggers. In some embodiments, the system includes a plurality of outriggers, and a single camera assembly monitors the plurality of outriggers.

According to another aspect, there is provided a crane having a carrier unit, a superstructure mounted on the carrier unit, at least one outrigger coupled to the carrier unit, the outrigger configured to extend and retract relative to the carrier unit and an outrigger monitoring system. The outrigger monitoring system includes a camera assembly configured to detect the presence of the at least one outrigger and a control system operably and communicably connected to the camera assembly. The control system includes a processor and computer readable storage media in communication with the processor, the computer readable storage media storing instructions, that when executed by the processor cause the control system to implement functions including an image recognition function configured to receive an image from the camera assembly and detect the presence of the at least one outrigger based on the received image.

In some embodiments, the camera assembly may be mounted to the chassis. In some embodiments, the camera assembly may be mounted to the superstructure.

In some embodiments, the functions further include a function for determining a slew angle of the superstructure.

In some embodiments, the crane has the same number of camera assemblies as outriggers. In some embodiment, the crane has more outriggers than camera assemblies, and one or more of the camera assemblies monitors a plurality of outriggers. In some embodiments, the crane further includes a jack coupled to a distal end of the outrigger, and the functions further include a function for determining an extension of the jack.

In some embodiments, a jack pad is coupled to the jack, and the functions further include a function for determining the presence of the jack pad.

According to another aspect, a method of monitoring a crane outrigger includes causing a crane to extend an outrigger, visually monitoring the outrigger using a camera assembly, and detecting a length of the outrigger using an image on the camera assembly. In some embodiments, the outrigger has a target and the length of the outrigger is detected by detecting the target. In some embodiments, the length of the outrigger is detected using edge detection of the image of the outrigger. In some embodiments, the method further includes monitoring the outrigger with the video camera to detect movement of the outrigger.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Detailed Description does not contain all of the aspects and embodiments of the one or more present inventions, is not meant to be limiting or restrictive in any manner, and that the invention(s) as disclosed herein is/are and will be understood by those of ordinary skill in the art to encompass obvious improvements and modifications thereto.

Additional advantages of the present invention will become readily apparent from the following discussion, particularly when taken together with the accompanying drawings.

Figure 1:
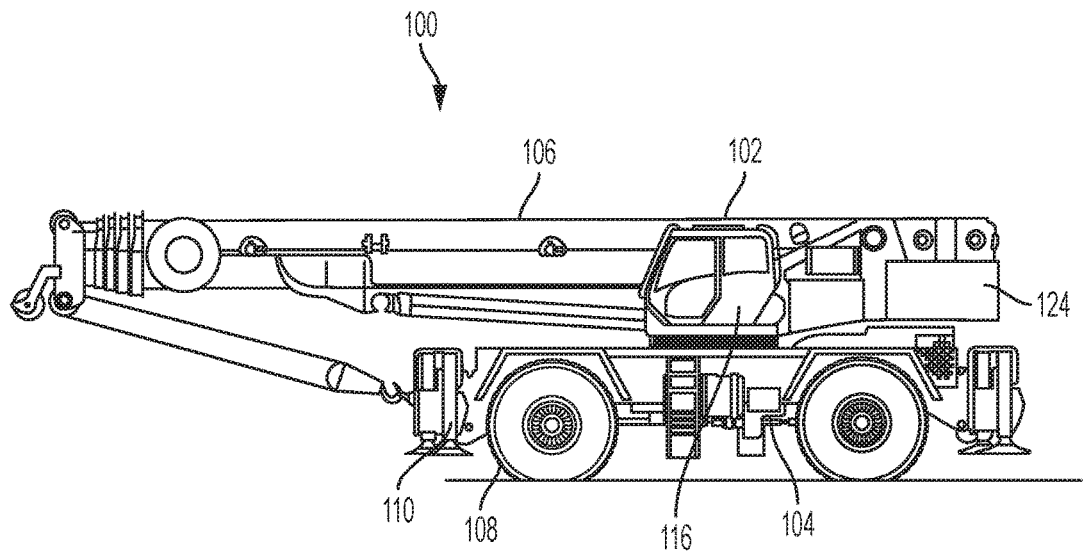
FIG. 1 illustrates a profile of a mobile crane, according to an embodiment described herein.
Figure 2:
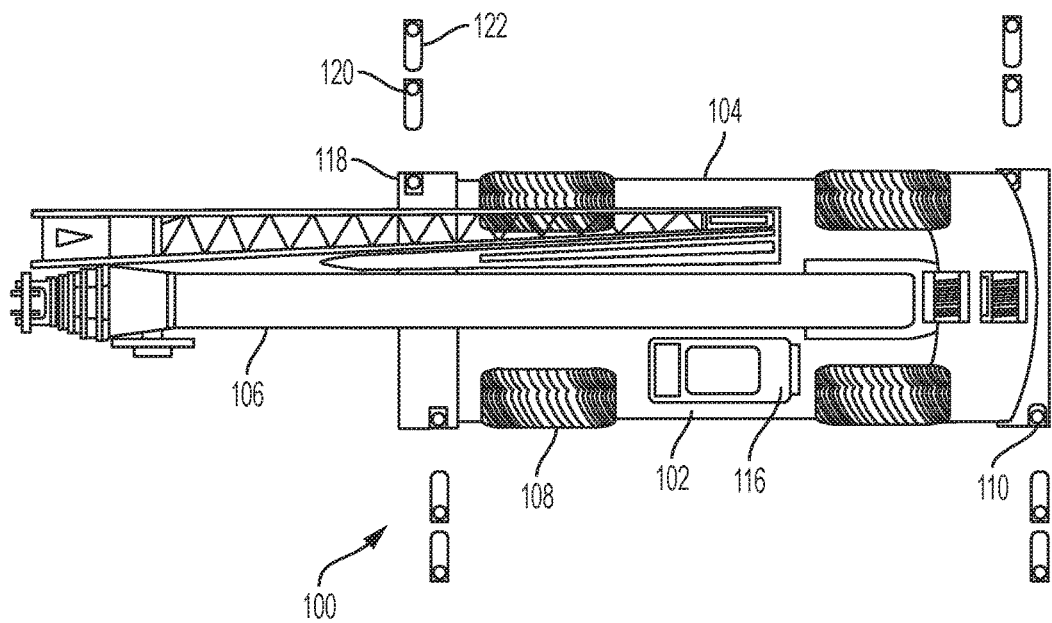
FIG. 2 illustrates a top view of a mobile crane, according to an embodiment described herein.

FIG. 1 illustrates a side view of a mobile crane 100 and FIG. 2 illustrates a top view of the mobile crane 100, according to embodiments described herein. Referring to FIG. 1 and FIG. 2, the mobile crane 100 comprises a superstructure unit 102 disposed on a transportable chassis or carrier unit 104. The superstructure unit 102 may include any of a variety of types of extendable booms (e.g., telescopic boom 106). The carrier unit 104 is provided with tires 108 that enable the mobile crane 100 to maneuver over land to a desired location for lifting tasks.

Figure 23:
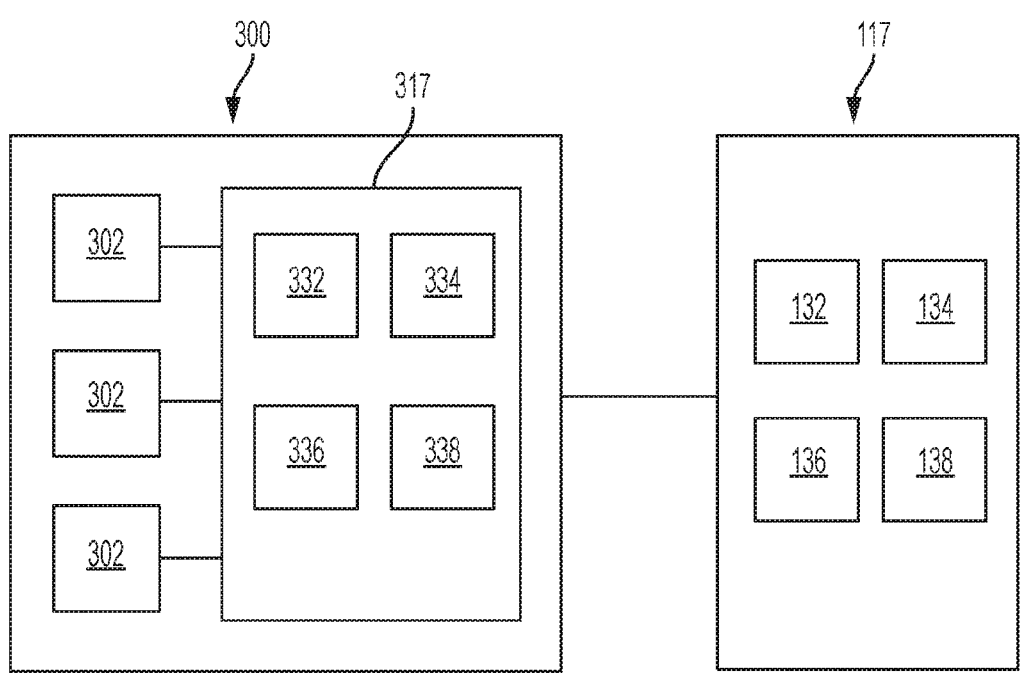
FIG. 23 is a diagram showing the outrigger monitoring system and the crane control system, according to an embodiment described herein.

The superstructure unit 102 may include a cab 116 from which an operator may control the function of the mobile crane 100. With reference to FIGS. 1, 2 and 23, a crane control system 117 comprising a computer processor 132, computer readable storage memory 134, a user interface 136, and a communications interface 138 may be located in the cab 116 or proximate the cab 116. In some embodiments, components of the crane control system 117 may be distributed in different sections of the mobile crane 100. The computer readable storage memory 134 is operably coupled to the computer processor 132 such that it is able to communicate with the computer processor 132. The computer readable storage memory 134 stores instructions that, when executed by the computer processor 132, cause the computer processor 132 to implement functions. The computer readable storage media 134 may also store information related to the operation of the mobile crane 100. The user interface 136 is operably coupled to the computer processor 132 such that an operator is able to interact with computer processor 132. For example, through the user interface 136 the operator may obtain information related to the mobile crane 100 operation and cause the computer processor 132 to implement a function.

Often when lifting loads, support is needed beyond what can be provided by the tires 108. Therefore, once the carrier unit 104 positions the mobile crane 100 at a location to perform lifting tasks, one or more 110 are provided for stabilizing the mobile crane 100 during lifting operations. The outriggers 110 are most often provided as part of the carrier unit 104. In the example illustrated in FIG. 1, the outriggers 110 include a set of front outriggers and a set of rear outriggers. As shown in the top view of FIG. 2, the outriggers may be extended from a fully retracted position 118, to a mid-point position 120, and to a fully extended position 122. Other positions are possible and embodiments are not limited to these three positions. Furthermore, in other mobile cranes the number of outriggers may be more or less that the four shown in FIG. 1 and FIG. 2.

Figure 3:
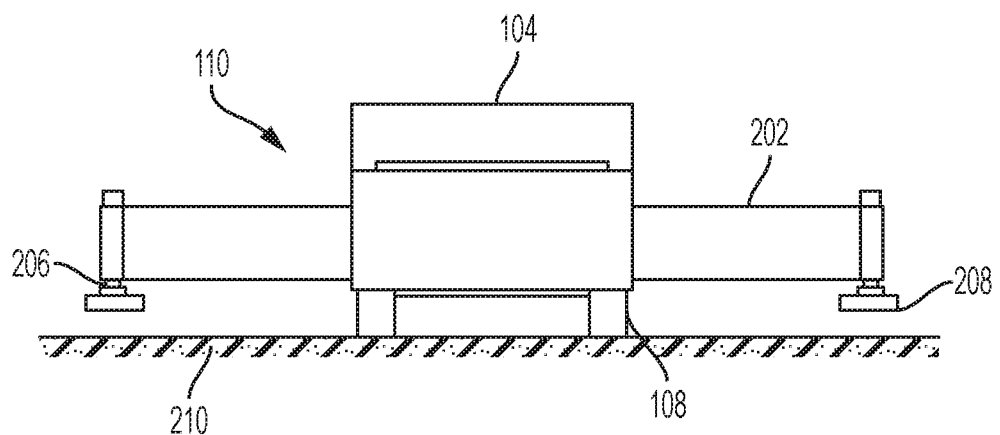
FIG. 3 illustrates a schematic of outriggers of a mobile crane with the jacks retracted, according to an embodiment described herein.
Figure 4:
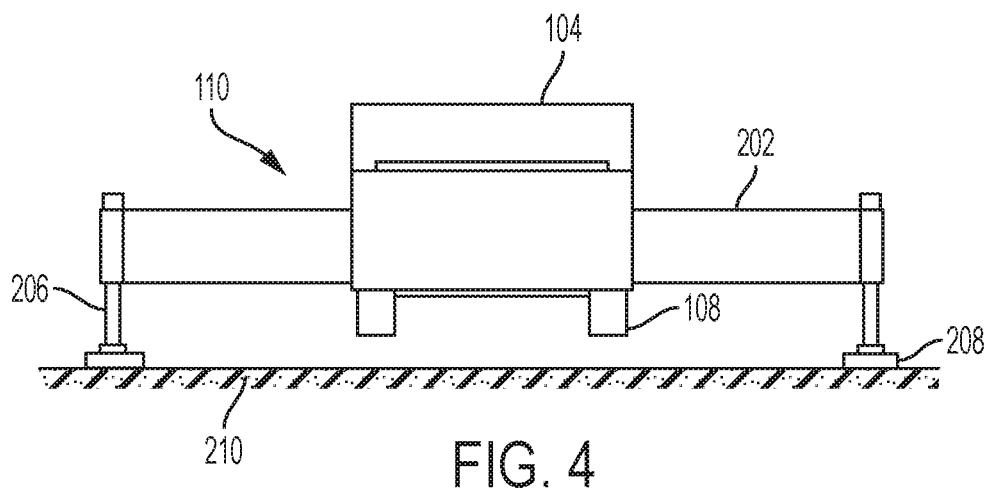
FIG. 4 illustrates the outriggers of FIG. 3 with the jacks extended.

FIG. 3 illustrates a schematic diagram of a set of outriggers 110 viewed perpendicularly to an axis of the outriggers 110, according to an embodiment. In this schematic, the superstructure unit 102 is omitted for clarity. FIG. 4 illustrates the schematic diagram of the set of outriggers 110 with an outrigger jack 206 extended, supporting the carrier unit 104, according to an embodiment. In one embodiment, the outriggers 110 comprise outrigger beams 202, outrigger jacks 206, and outrigger pads 208. In another embodiment, the outriggers 110 may be formed substantially as jacks, i.e., without a horizontal beam component, so that the outriggers only extend substantially in a vertical direction. The outrigger beams 202 are configured to extend and retract from the carrier unit 104 by a linear actuator such as a rack and pinion, a hydraulic cylinder, or other linear actuator. On some cranes, the outriggers 110 may retract by folding and extend as they are unfolded. The outrigger jack 206 is coupled to the outrigger beam 202 at an outer or distal end. The outrigger jacks 206 are configured to extend and retract vertically. The outrigger pad 208 is attached to a lower end of the outrigger jack 206 and is lifted by the outrigger jack 206 with the outrigger jack 206 retracted, and may support the carrier unit 104 with the outrigger jack 206 extended as shown in FIG. 4. An operator may interact with the crane control system 117 through the user interface 136 to implement a function to cause the outrigger jacks 206 to extend and lift the carrier unit 104.

In FIG. 3, the carrier unit 104 is supported by tires 108. In normal transport mode, the carrier unit 104 is supported by the tires 108. During transport, the outrigger beams 202 would typically be retracted. If the mobile crane 100 were to attempt to lift a load with the configuration shown in FIG. 3, with the outrigger beams 202 extended, but with the outrigger jacks 206 retracted, the lateral stability of the mobile crane 100 would be the same as if the outrigger beams 202 were not extended. That is, benefits typically associated with the use of outriggers, such as stability or increased load capacity, for example, may not be realized if the outrigger beams 202 are extended (deployed) but the jacks 206 remain retracted and do not engage the ground or other base surface 210.

In FIG. 4, the outrigger jacks 206 are shown extended such that the outrigger pads 208 contact the base surface 210 and the carrier unit 104 is lifted. The outrigger pads 208 are then supporting the weight of the mobile crane 100 and any load the mobile crane 100 is lifting. The configuration in FIG. 4 is more stable than the configuration of FIG. 3, because the effective fulcrum has been moved from the edge of the tire 108 to where the outrigger pad 208 contacts the base surface 210.

It is beneficial that the length of each outrigger extension is known since the capacity of the crane 100 may be based on the position of the outriggers. For example, a mobile crane 100 may have a higher load capacity with an outrigger 110 at the fully extended position 122 compared to the outrigger 110 at the intermediate position 120.

Referring generally to FIGS. 5-19 and 23, in the embodiments described herein and below, the present disclosure makes use of cameras to achieve the desired results of outrigger length detection and/or monitoring of the outriggers and a surrounding area. For example, the mobile crane 100 may include an optical outrigger monitoring system 300 (see FIG. 23) that includes one or more camera assemblies 302 mounted on the mobile crane 100. With reference to FIG. 23, the optical outrigger monitoring system 300 also includes a control system 317 comprising a computer processor 332, computer readable storage memory 334, a user interface 336, and a communications interface 338, similar to those described above with respect to the crane control system 117, to which the one or more camera assemblies 302 are operatively and communicably coupled. The computer readable storage memory 334 stores instructions that, when executed by the computer processor 332, cause the computer processor 332 to implement functions. Alternatively, the optical outrigger monitoring system 300 may be operably and communicably coupled to the crane control system 117, such that the optical outrigger monitoring system 300 and the crane control system 117 share one or more common computer processors, computer readable storage memory, a user interface, and a communications interface. In one embodiment, the control system 317 of the optical outrigger monitoring system 300 and the crane control system 117 may be one and the same. Components of the optical outrigger monitoring system 300 may be co-located with individual cameras or camera assemblies 302, be located in a centralized location and communicably connected to the camera assemblies 302 over a conventional communication interface, or both.

The one or more camera assemblies 302 may be mounted, for example, on the carrier unit 104, the superstructure 102 or both. Suitable locations on the superstructure 102 for mounting the one or more camera assemblies 302 include, but are not limited to, the cab 116, the boom 106, a counterweight 124 (see FIG. 1), or other intermediate or connecting structures between these components. Each camera assembly 302 may be either a single camera or multiple cameras, or similar image capturing devices, configured to capture images across a desired field of view. For example, in one embodiment, the camera assembly 302 may be a single camera, such as a wide angle camera, or a combination of cameras working in conjunction with one another to capture an image or images across a field of view of up to, for example, 180 degrees. Each camera may be, for example, a camera capable of capturing still images and/or video, such as a digital camera.

In one embodiment, the optical outrigger monitoring system 300 may include a first camera assembly 302 configured to monitor two outriggers 110. For example, the first camera assembly 302 may be mounted at a first side of the mobile crane 100 in a position where a forward outrigger and a rear outrigger at the first side of the crane are disposed in the field of view of the first camera assembly 302. A second camera assembly 302 may be mounted at a second side of the mobile crane 100 in a position where a forward outrigger and a rear outrigger at the second side of the crane 100 are in the field of view of the second camera assembly 302. In one embodiment, the first side may be a left side of the mobile crane 100 and the second side may be a right side of the mobile crane 100. Alternatively, the first side may be a front of the mobile crane 100, and the first camera assembly 302 may monitor left and right forward outriggers 110, while the second side may be a rear of the mobile crane 100, and the second camera assembly 302 may monitor left and right rear outriggers 102. Thus in one embodiment, each camera assembly 302 may monitor a plurality of outriggers 110. An example of such a configuration is described further below and shown in FIG. 10.

In one embodiment, a camera assembly 302 may be configured to detect, for example, the presence of an outrigger beam 202, outrigger jack 206 and/or outrigger pad 208, movement of the outrigger beam 202, outrigger jack 206 and/or outrigger pad 208, and, in conjunction with the optical outrigger monitoring system 300, may determine a position and/or length of extension of the outrigger beam 202, outrigger jack 206 and/or outrigger pad 208.

However, it is understood that the present disclosure is not limited to the examples above. For example, in other embodiments, the optical outrigger monitoring system 300 may include a single camera assembly 302 associated with each outrigger 110, such that each camera assembly 302 monitors only a single outrigger 110. In other embodiments, more than one camera assembly 302 may monitor each outrigger 110. Such a configuration may be useful for confirming detected or measured positions and providing redundancy in case of improper functioning of a camera assembly 302.

The examples below are provided to illustrate several embodiments of optical outrigger monitoring system 300. However, it is understood that the present disclosure is not limited to the embodiments or configurations below.

Figure 5:
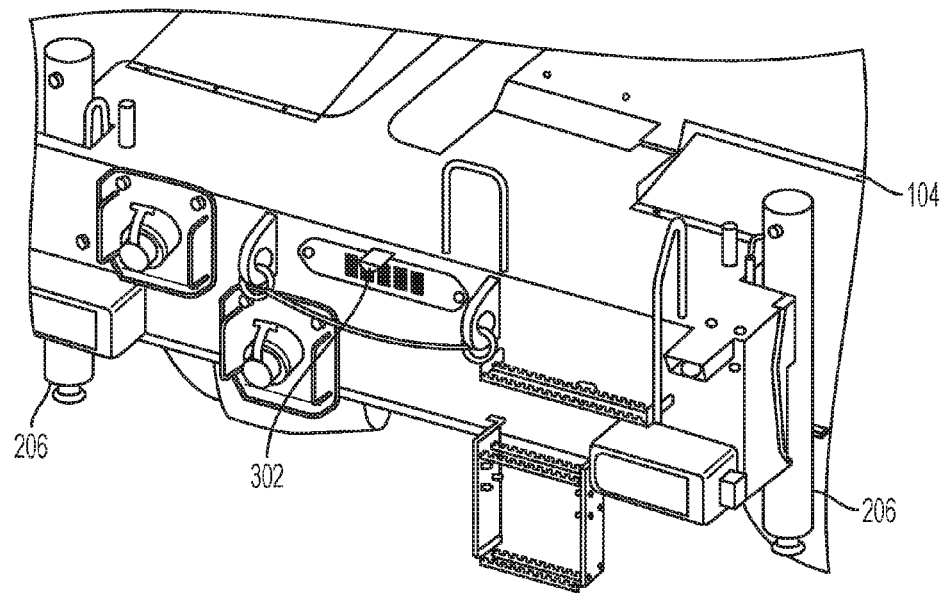
FIG. 5 illustrates a front view of a mobile crane showing an example of placement of a camera assembly, according to an embodiment described herein.

FIG. 5 illustrates the carrier unit 104 having two outrigger jacks 206 at a forward end of the carrier unit 104. In one embodiment, a camera assembly 302 is attached to a forward surface of the carrier unit 104. The camera assembly 302 may be comprised of multiple individual cameras orientated to view specific areas of the mobile crane 100. Preferably, at least one individual camera has a line of sight to an outrigger 110.

Figure 6:
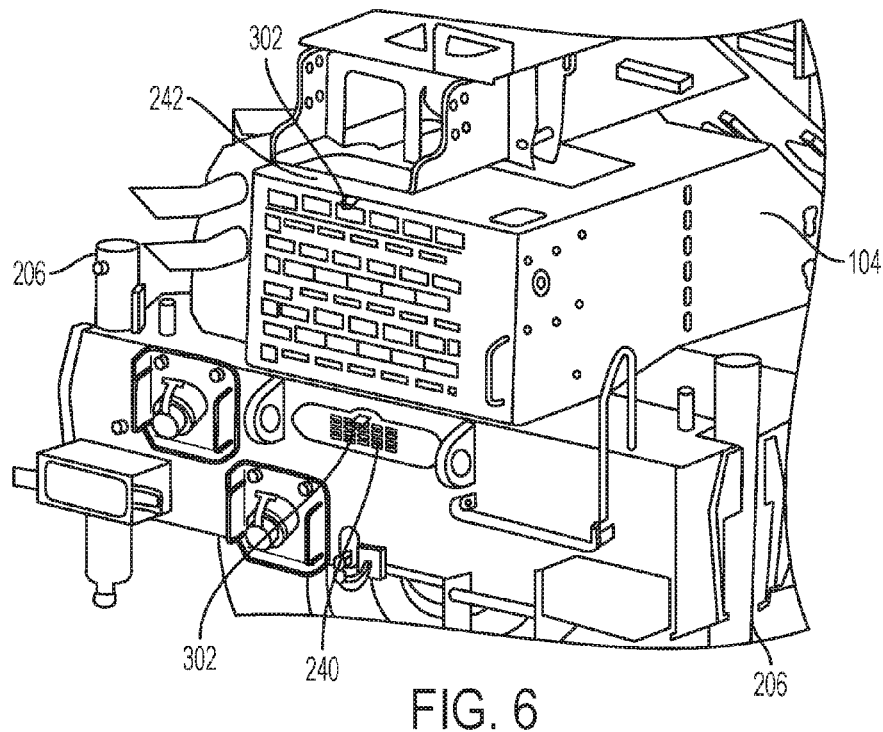
FIG. 6 illustrates a rear view of a mobile crane showing an example of placement of a camera assembly, according to an embodiment described herein.

FIG. 6 illustrates a rear end of the carrier unit 104 having an outrigger jack 206 at a rearward end of the carrier unit 104. In one embodiment, the camera assembly 302 may be placed at a lower position 240 or at an upper position 242 on a rear surface of the carrier unit 104. The camera assembly 302 may have a line of sight to the outrigger jack 206 at the rearward end of the carrier unit 104. In some embodiments, the carrier unit 104 may have multiple camera assemblies 302, such as at both the upper position 242 and the lower position 240.

Figure 7:
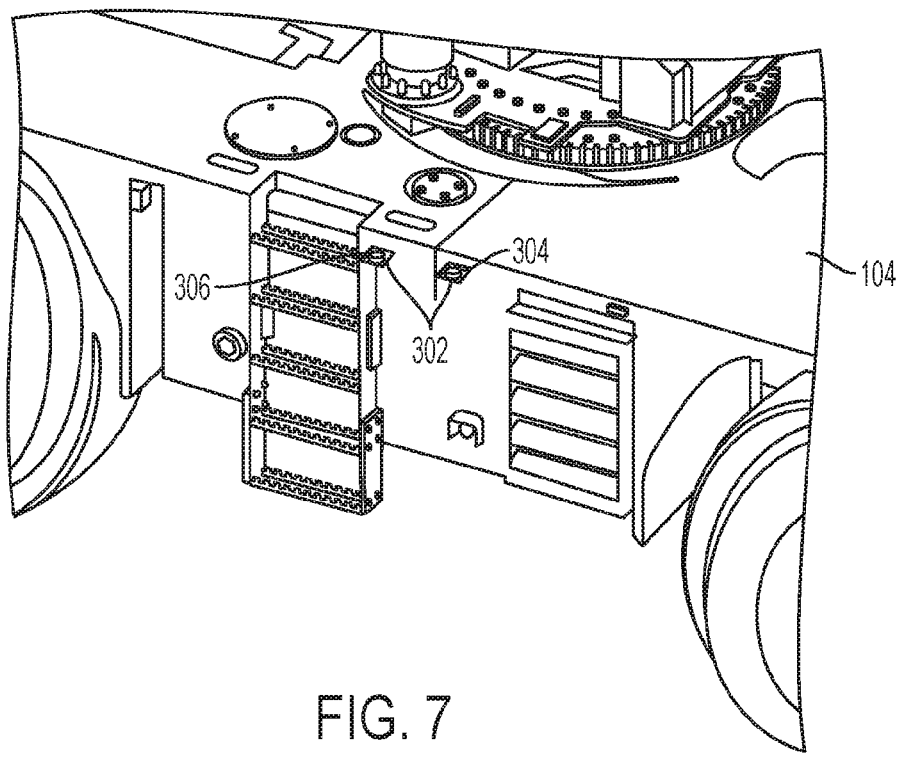
FIG. 7 illustrates a side view of a mobile crane showing an example of placement of a camera assembly, according to an embodiment described herein.
Figure 8:
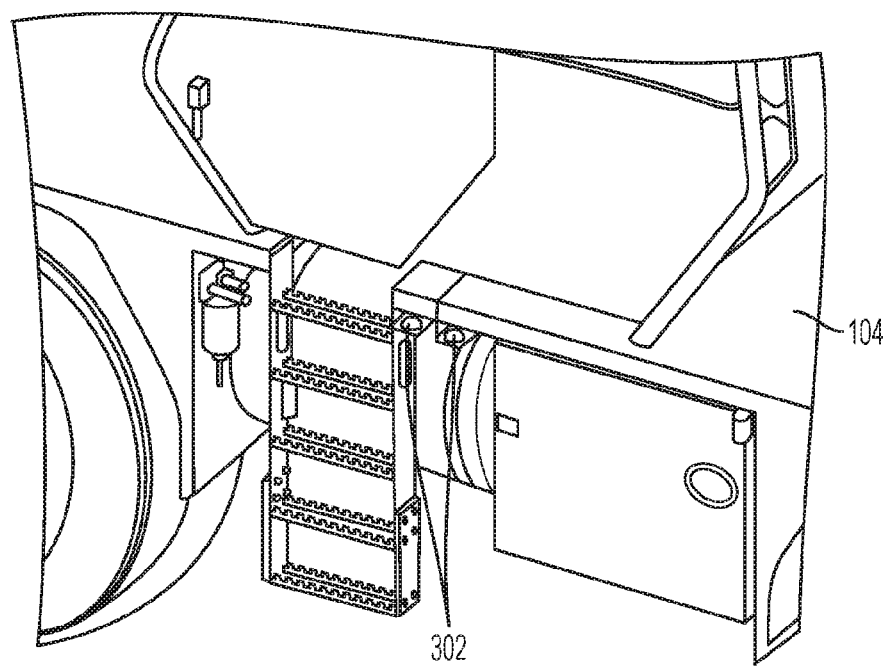
FIG. 8 illustrates a side view of a mobile crane showing an example of placement of a camera assembly, according to an embodiment described herein.

FIG. 7 illustrates a side view of a carrier unit 104. In one embodiment, a pair of camera assemblies 302 are mounted on a side surface of the carrier unit 104. Each camera assembly 302 may be orientated to view a different end of the carrier unit 104. For example, camera assemblies 302 may include a first camera assembly 304 that may be orientated rearward for monitoring a rear outrigger and a second camera assembly 306 that may be orientated forward to monitor a forward outrigger. FIG. 8 is similar to FIG. 7, but illustrates an opposite side of the carrier unit 104. In one embodiment, the opposite side also includes two camera assemblies 302 for monitoring the front and rear outriggers on the opposite side of the carrier unit 104. In some embodiments, a single wide angle lens camera may be used in a camera assembly 302 in place of two camera assemblies for detecting the outriggers. It is understood that the embodiments shown in FIGS. 5-7 are usable together as part of the optical outrigger monitoring system 300, or may be implemented individually or separate from one another and/or may also operate independently of one another.

Figure 9:
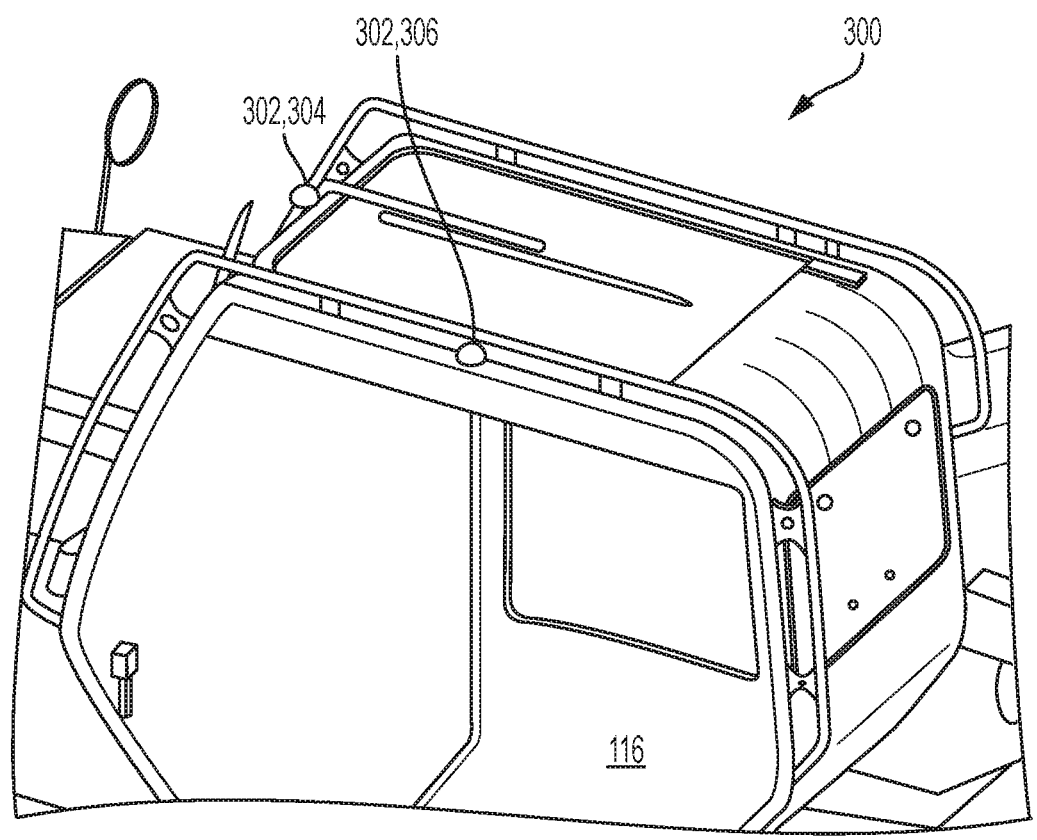
FIG. 9 illustrates a view of a cab of a mobile crane showing placement of a camera assembly, according to an embodiment described herein.

FIG. 9 illustrates another embodiment of an optical outrigger monitoring system 300 that may be used in combination with the preceding examples, or may be used independently of camera assemblies 302 mounted on the carrier unit 104 described above. In FIG. 9, the one or more camera assemblies 302 of optical outrigger monitoring system 300 may include a first camera assembly 304 is mounted on a forward end of the cab 116 and a second camera assembly 306 is mounted on a lateral side of the cab 116. Other camera assemblies may be positioned in other locations on the cab 116. Like the camera assemblies 302 mounted to the carrier unit 104, the cab 116 mounted camera assemblies 304, 306 may be utilized to detect an extension of an outrigger 110 using one or more of the techniques described below.

Figure 10:
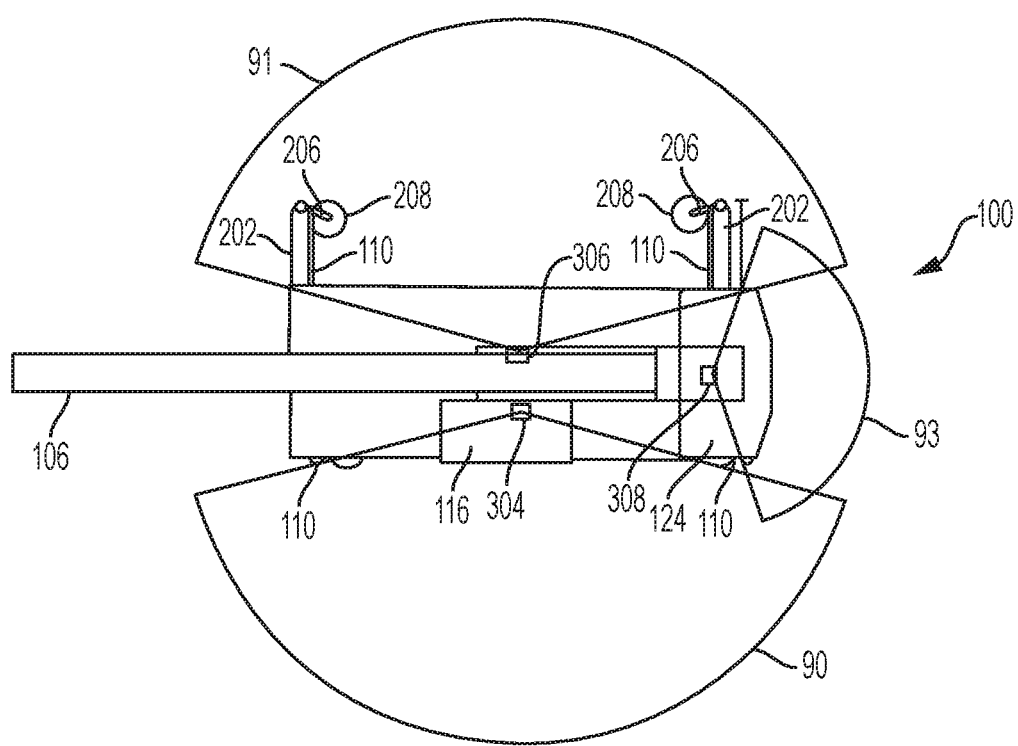
FIG. 10 illustrates an overhead schematic of a mobile crane showing a field of view of camera assemblies, according to an embodiment described herein.

FIG. 10 is an overhead schematic showing an example of another configuration of the optical outrigger monitoring system 300. Referring to FIG. 10, the optical outrigger monitoring system 300 may include a plurality of camera assemblies 302 including a first camera assembly 304 mounted at a first side of the superstructure 102 and a second camera assembly 306 mounted at a second side of the superstructure 102. FIG. 10 shows arcs 90, 91 representing fields of view of the first and second camera assemblies 304, 306. The first and second camera assemblies 304, 306 may be mounted, for example, to the cab 116, the counterweight 124, the boom 106, intermediate superstructure components, or combinations thereof. In this example, the forward and rear left side outriggers 110 are within a field of view of the first camera assembly 304 and the forward and rear right side outriggers 110 are within a field of view of the second camera assembly 306. Accordingly, the first camera assembly 304 may be used to monitor, detect and/or calculate a position of the forward and rear outriggers 110 at the left side of the crane 100, and the second camera assembly 306 may be used to monitor, detect and/or calculate a position of the forward and rear outriggers 110 at the left side of the crane 100.

In one embodiment, the first and second camera assemblies 304, 306 may be the only camera assemblies in the optical outrigger monitoring system 300. However, in another embodiment, the optical outrigger monitoring system 300 may further include a third camera assembly 308, and optionally additional camera assemblies. As shown in FIG. 10, the third camera assembly 308 may be mounted on a rear of the superstructure 102 such that area at the rear of the crane is in the field of view of the third camera assembly 308. The field of view of the third camera assembly 308 is represented by an arc 93 in FIG. 10.

Further, in one embodiment, the camera assemblies 302 of the optical outrigger monitoring system 300 may include only three camera assemblies 304, 306, 308. In one embodiment, two camera assemblies may be positioned on opposing sides (e.g., left and right sides) of the crane 100, while a third camera assembly 308 is disposed at a rear portion of the crane 100. A fourth camera assembly at a front of crane 100 may be omitted because the front of the crane 100 and an area surrounding the front of the crane 100 are within a normal field of view of the operator.

In one embodiment, the first and second camera assemblies 304, 306 may be positioned at a same position lengthwise along the superstructure 102, such that the forward and rear outriggers 110 on the first side are the same distance from the first camera assembly 304 as the forward and rear outriggers, respectively, on the second side are from the second camera assembly 306. Further, in one embodiment, the first camera assembly 304 may be positioned symmetrically, i.e., at a midpoint, between the forward and rear outriggers on the first side, and the second camera assembly 306 may be positioned symmetrically, i.e., at a midpoint between the forward and rear outriggers on the second side.

Figure 11:
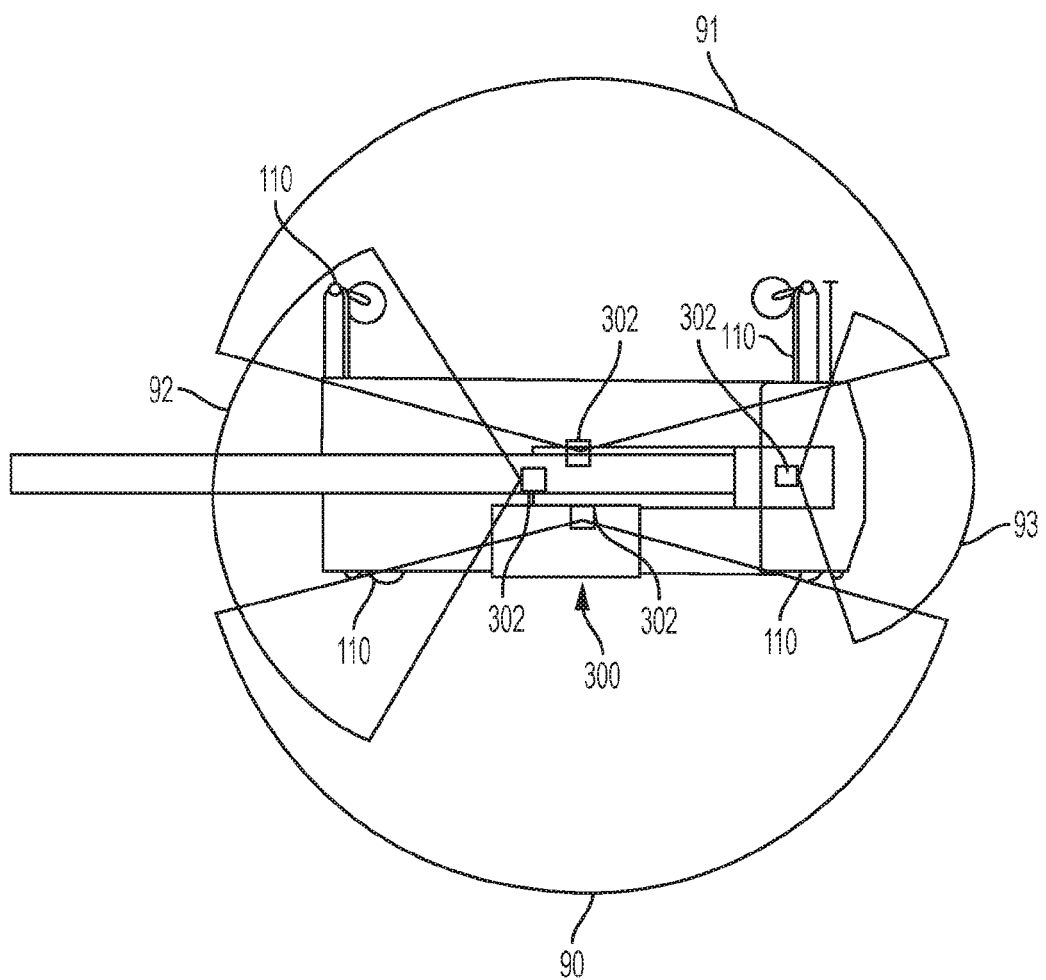
FIG. 11 illustrates an overhead schematic of a mobile crane showing the field of view of a plurality of cameras, according to an embodiment described herein.

FIG. 11 illustrates an overhead schematic of a mobile crane 100 having an optical outrigger detection system 300. This embodiment has four camera assemblies 302, each looking in a different direction as shown by arcs 90, 91, 92, 93. Each camera assembly 302 includes one or more cameras for optically detecting the extension of an outrigger 110. The camera assembly 302 may detect the outrigger 110 position using a variety of techniques. In some embodiments, the camera assembly 302 may optically detect an end of the outrigger beam 202 through optical recognition algorithms such as edge detection using brightness discontinuities. The optical recognition algorithms may be stored in the memory and/or executed by the processor at, for example, the control system 317 of the optical outrigger monitoring system 300 based on images received from the camera assemblies 302, and/or at individual camera assemblies 302. Because the camera assembly 302 is in a known location, the extension of the outrigger beam 202 may be determined based on the detected end of the outrigger beam 202 in the field of view of the camera assembly 302. The camera assembly 302 may detect the end of the outrigger beam 202 and then look up a position based on the pixel location of the detected end of the outrigger beam 202. Or in other embodiments, the location of the end of the outrigger beam 202 may be calculated in real time based on the detected pixel location in the field of view of the camera assembly 302. For example, if the end of the outrigger beam 202 were determined to be at a particular angle relative to a centerline of the camera assembly 302, then a table may give an extension corresponding to that particular angle. In other embodiments, the detected end may be at a particular pixel location, which is then looked up on the chart to give an extension corresponding to that particular pixel location. In still other embodiments, once the relative location of the beam end is detected, the physical length of the beam may be calculated using commonly known techniques such as trigonometry.

Figure 12:
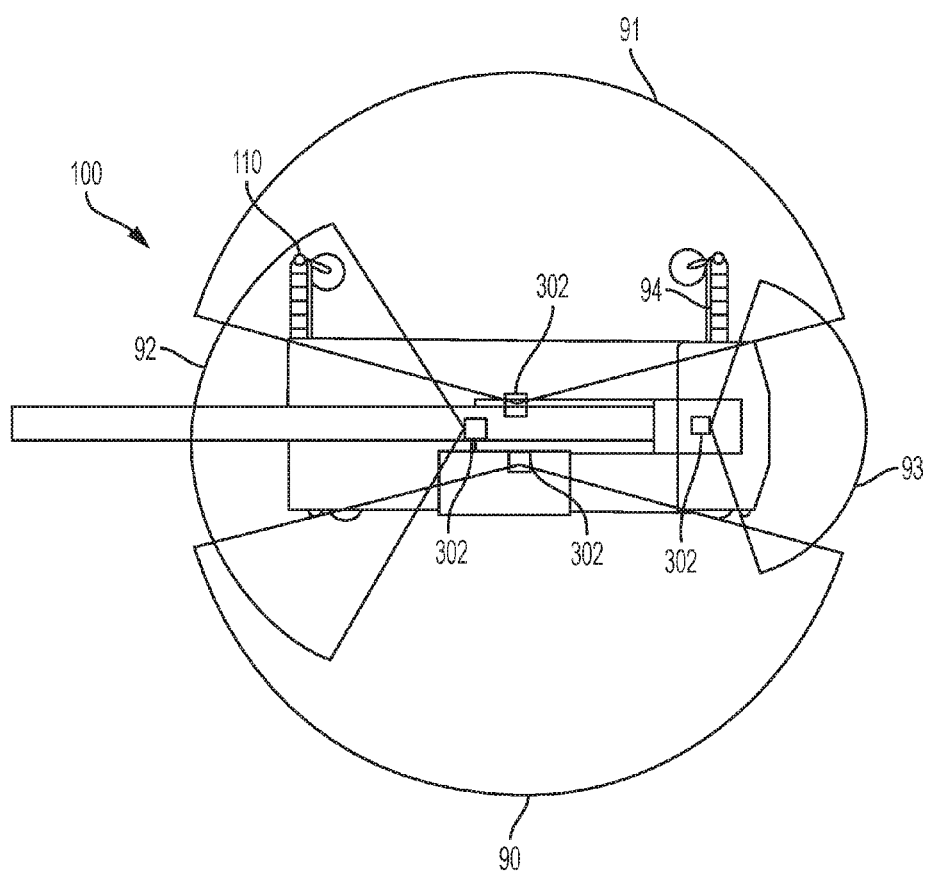
FIG. 12 illustrates an overhead schematic of a mobile crane an outrigger with a target, according to an embodiment described herein.
Figure 13:
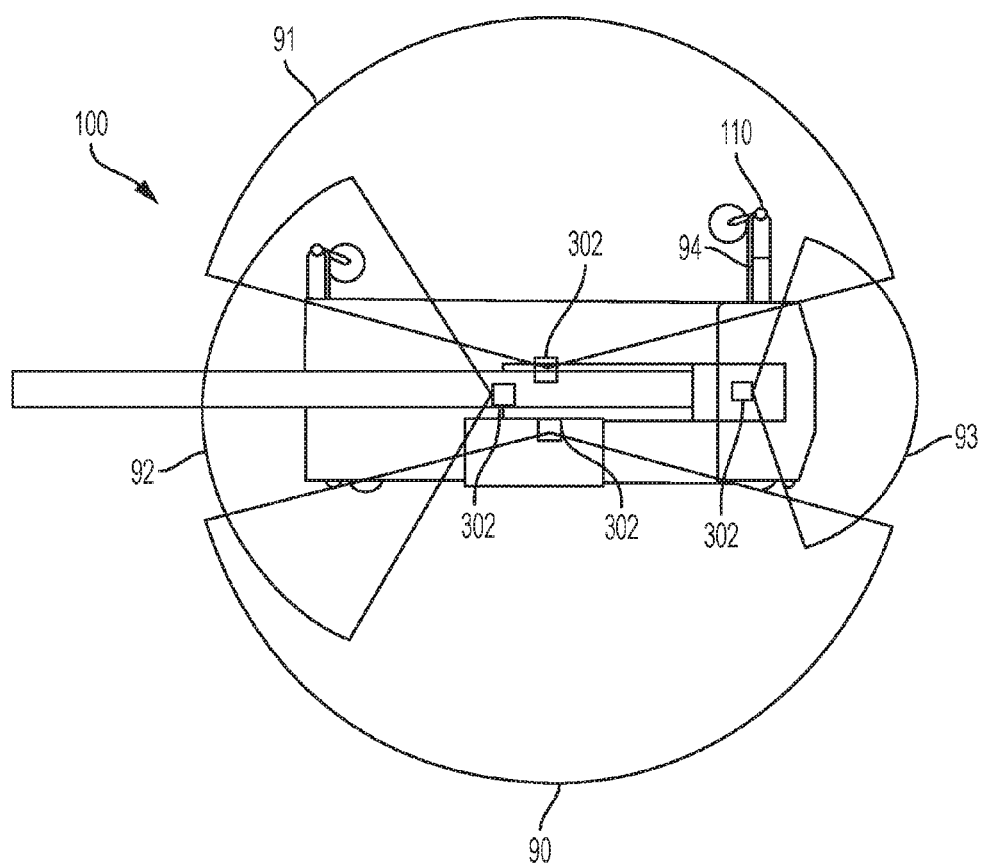
FIG. 13 illustrates an overhead schematic of a mobile crane showing the field of view of a plurality of cameras with one outrigger partially extended, according to an embodiment described herein.

FIG. 12 illustrates an overhead schematic of a mobile crane 100, similar to that of FIG. 11, with the exception that the outriggers 110 are marked with readily visible markers or targets 94 for detecting the position of the outriggers 110. In this example, the markers 94 are horizontal lines, but other patterns may be used. A chart may correlate the markers 94 to known outrigger 110 extensions. The camera assemblies 302 detect the visible portion of the markers 94 using conventional pattern recognition algorithms, and the detected portion of the markers are then compared to the chart to find the extension distance. The pattern recognition algorithms may be stored in a memory and/or executed by a processor of the control system 317 of the optical outrigger monitoring system 300, and/or at the individual camera assemblies 302.

In each of these embodiments, the optical outrigger monitoring system 300 is configured to differentiate the outrigger 110 or marker 94 from the background. In some embodiments, the outrigger 110, or a portion of the outrigger 110, a target on the outrigger 110 may be a section that is coated with a special color and/or pattern to help differentiate the outrigger 110 from the background. For example, the outrigger beam 202 could have a fluorescent marker, a reflective marker, or other highly visible marker on the outrigger beam to increase the contrast of the outrigger beam 202 relative to the background.

In the embodiment of FIG. 12, the visible portion of the markers 94 is captured by the camera assembly 302 which then converts the image into a code representing the visible portion of the image. For example, if five lines were visible to the camera assembly 302, the system may convert the image into a numeric code of five. The pattern may directly correspond to a measurement, i.e. each line could be one foot apart, such that the numeric code is a direct measurement, or in some embodiment the numeric code may be compared to a table to look up a corresponding outrigger length.

Each of the described detection methods may be combined with other methods listed so as to aid and backup and give an alternate or redundant method of determining the length or position. For example, the embodiment illustrated in FIG. 13 has an outrigger 110 with a marker 94 that is only visible once the outrigger 110 is past a 50% extension. For distances less than 50%, the marker 94 is not visible and the system uses optical recognition of the outrigger 110 end to determine the outrigger 110 positioning. Once the marker 94 comes into view by further extending the outrigger 110, the marker 94 may be used for recognition. Or in other embodiments, the optical marker 94 may generally be used for measurements and the end of the outrigger 110 being detected with edge detection to generally verify the measurement. For example, if the marker 94 were obscured and the camera missed a portion of the marker 94, the detected edge of the end of the outrigger 110 may give a reading inconsistent with the detected marker 94, alerting the operator to a possible problem.

The present disclosure is not limited to the examples above. It is understood that the targets, markers, coatings and the like described above may be disposed on one or more of the outrigger beams 202, jacks 206 or pads 208. In addition the camera assemblies 302, either individually or in conjunction with the control system 317, may detect ends, edges, or other, e.g., intermediate, locations on one or more of the outrigger beams 202, jacks 206 and pads 208. Further, the outriggers beams 202, jacks 206 and pads 208 may, individually or together, be a target.

Figure 14:
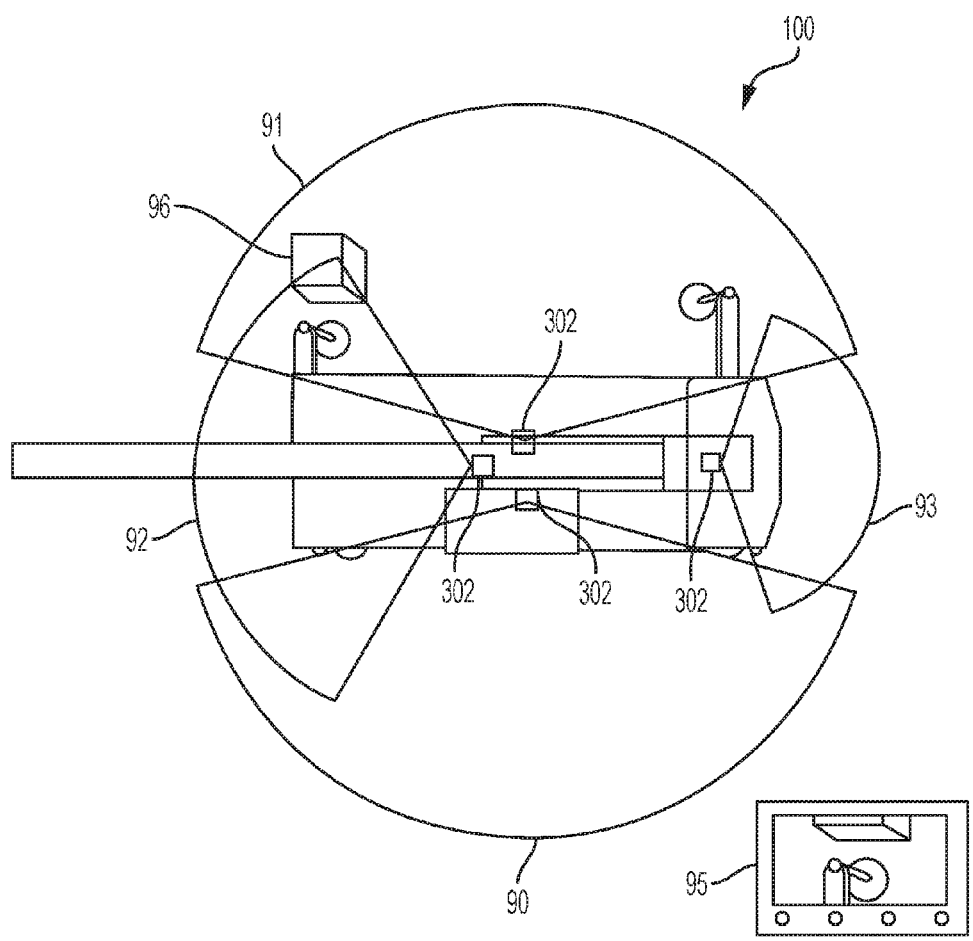
FIG. 14 illustrates an overhead schematic of a mobile crane showing the field of view of a plurality of cameras and an object near an outrigger, according to an embodiment described herein.

Further, the camera assemblies 302 are not limited only to monitoring and detecting extension of the outriggers 110. For example, as illustrated in FIG. 14, in some embodiments, the optical outrigger detection system 300 may be used to view the surrounding area of the outrigger 110 as it is being moved. For example, visibility of the outrigger 110 may be restricted from the cab 116 of the mobile crane 100 and it would be beneficial to be able to observe the outrigger 110 as it is being extended. This may be done by detecting a change in the outrigger 110 image, or it may result from an output from the crane control system 117. When a command is given to move one of the outriggers 110, the outrigger control system 117 could send a signal to the optical outrigger detection system 300 and switch a user interface 95 to a closer view of the outrigger 110 being moved.

Figure 15:
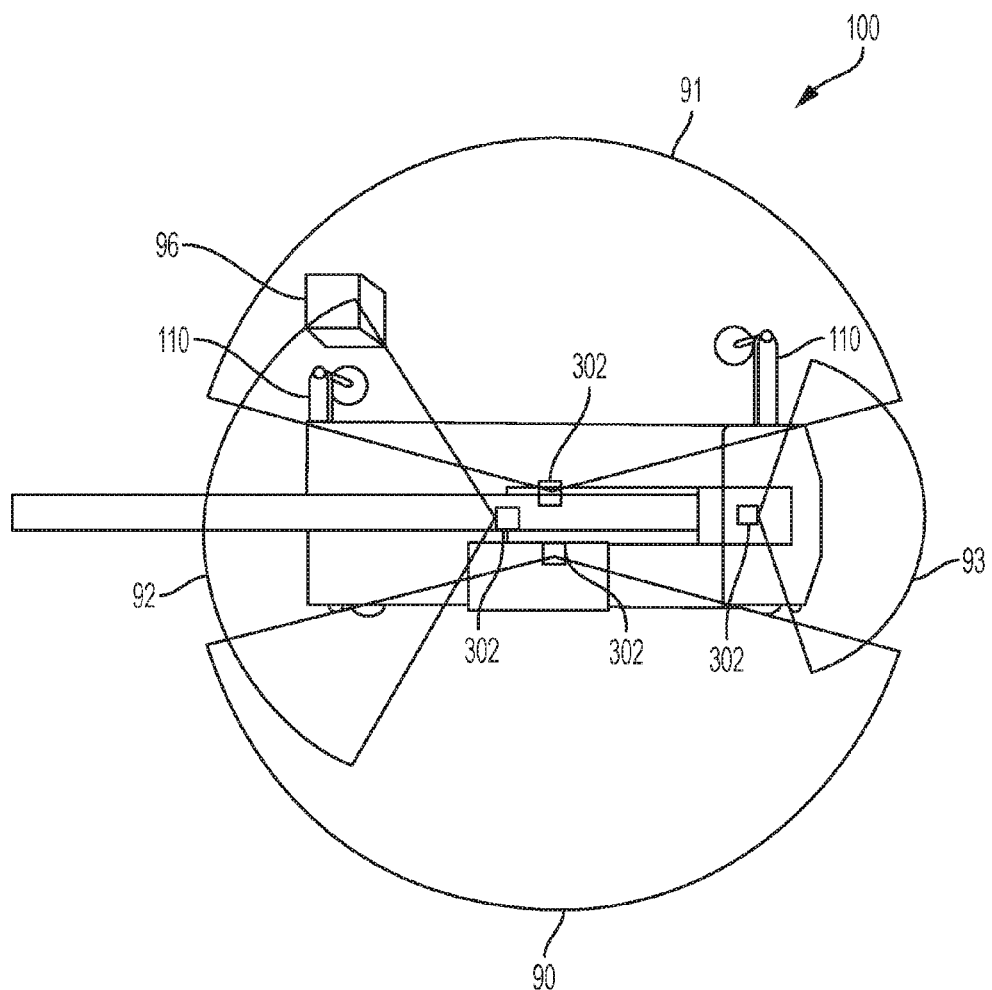
FIG. 15 illustrates an overhead schematic of a mobile crane showing the field of view of a plurality of cameras and an object near an outrigger, according to an embodiment described herein.

FIG. 15 illustrates another embodiment in which the camera assemblies 302, either individually or in conjunction with the control system 317, may automatically detect objects 96 and warn the operator of the presence of the object 96. In combination with the ability to view the outrigger 110 as it is being moved, the system 300 may allow the operator to see any objects 96 in the path of the outrigger 110 that would otherwise be hidden from the view of the cab 116. For example, the system 300 may alert the operator to the presence of the object 96, which may then be displayed on a user interface 95 as shown in FIG. 14. The object 96 may be detected and tracked by using any of several known video tracking algorithms such as "blob tracking". The video tracking algorithm may be stored in a memory and/or executed by a processor of the control system 317, and/or at individual camera assemblies 302.

In some embodiments, an outrigger envelope is defined. If a change is detected in an image of the outrigger envelope, the position of the object 96 may be calculated with one of the above methods. In some embodiments, the position of the object 96 may be determined through triangulation by a plurality of cameras, or the position may be determined through the use of an additional sensor such as an ultrasonic distance sensor, a laser distance sensor, light detection and ranging techniques (commonly referred to as "LIDAR"), and/or infrared techniques. If the position of the object 96 is in the defined envelope of the outriggers (or larger area if desired), then a warning may be given.

Figure 16:
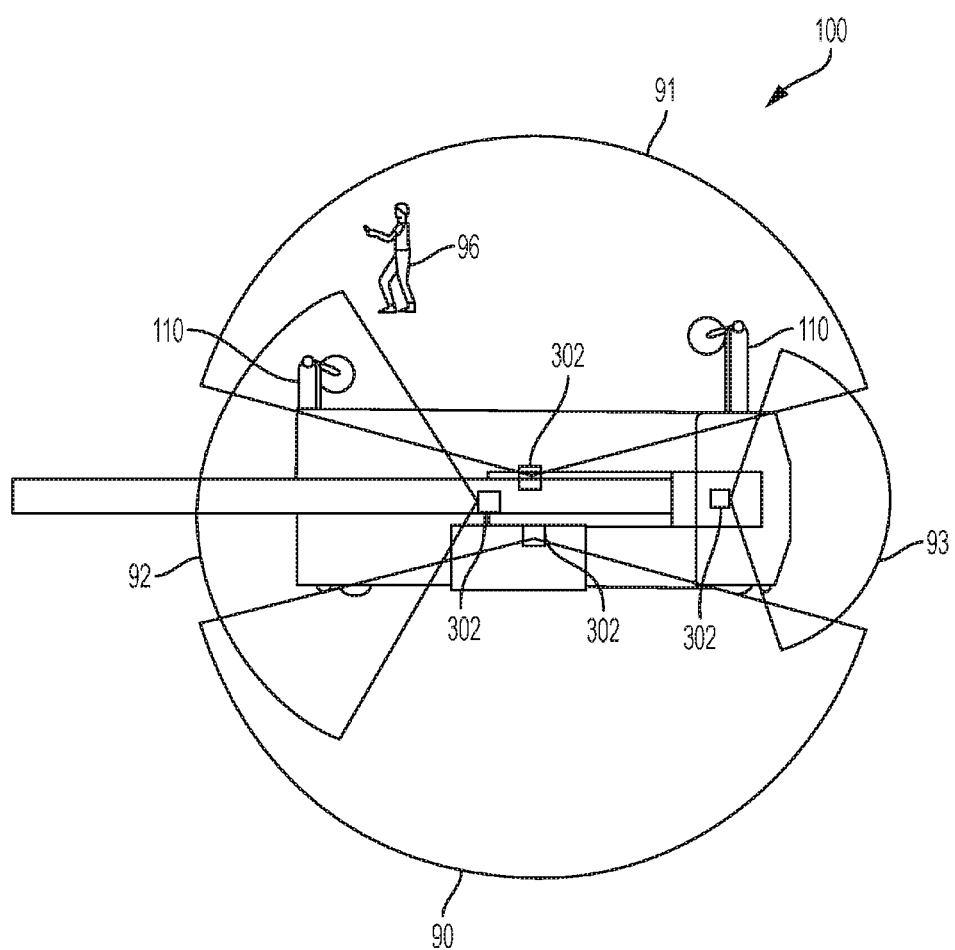
FIG. 16 illustrates an overhead schematic of a mobile crane showing the field of view of a plurality of cameras and a person near an outrigger, according to an embodiment described herein.

In another embodiment illustrated in FIG. 16, the system detects and alerts when objects 96 are moving in the proximity of the crane 100. In FIG. 16, a person 96 has walked into the defined envelope of the mobile crane 100. It would be advantageous to alert the operator to any objects 96 that are moving in the crane working envelope. The video tracking detects objects 96 that are moving in the crane envelope and gives a warning to the crane operator. The tracking of the moving object may be done with any known video tracking techniques.

Figure 17:
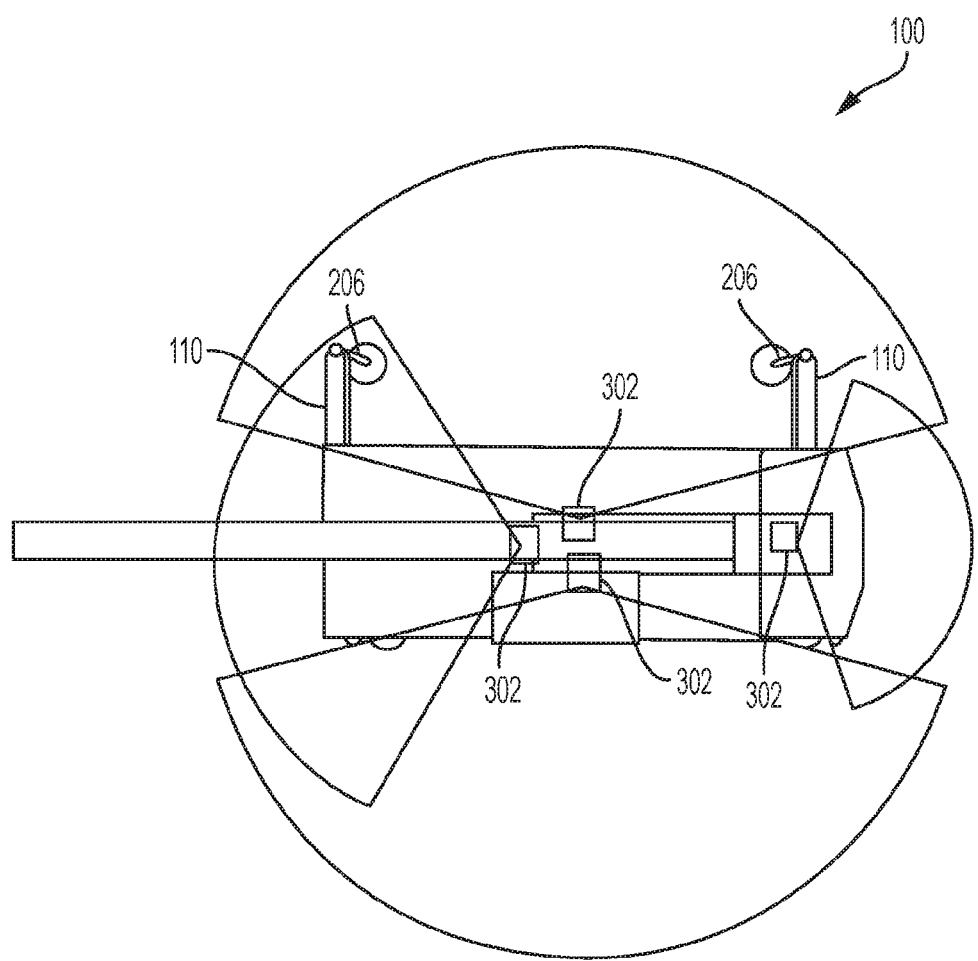
FIG. 17 illustrates an overhead schematic of a mobile crane showing the field of view of a plurality of cameras and an outrigger jack, according to an embodiment described herein.

In addition to the detection of the outrigger positioning, it is also possible to detect the extension of the outrigger jacks 206. As shown in FIG. 17, detecting the position of the jacks 16 is done in the same manner as the detection of the outrigger 110 position. However, because the distance from the mobile crane 100 will affect the detected amount of extension of the jacks 206, the system may take into account the position of the outriggers 110 before determining a jack 206 position.

Figure 18:
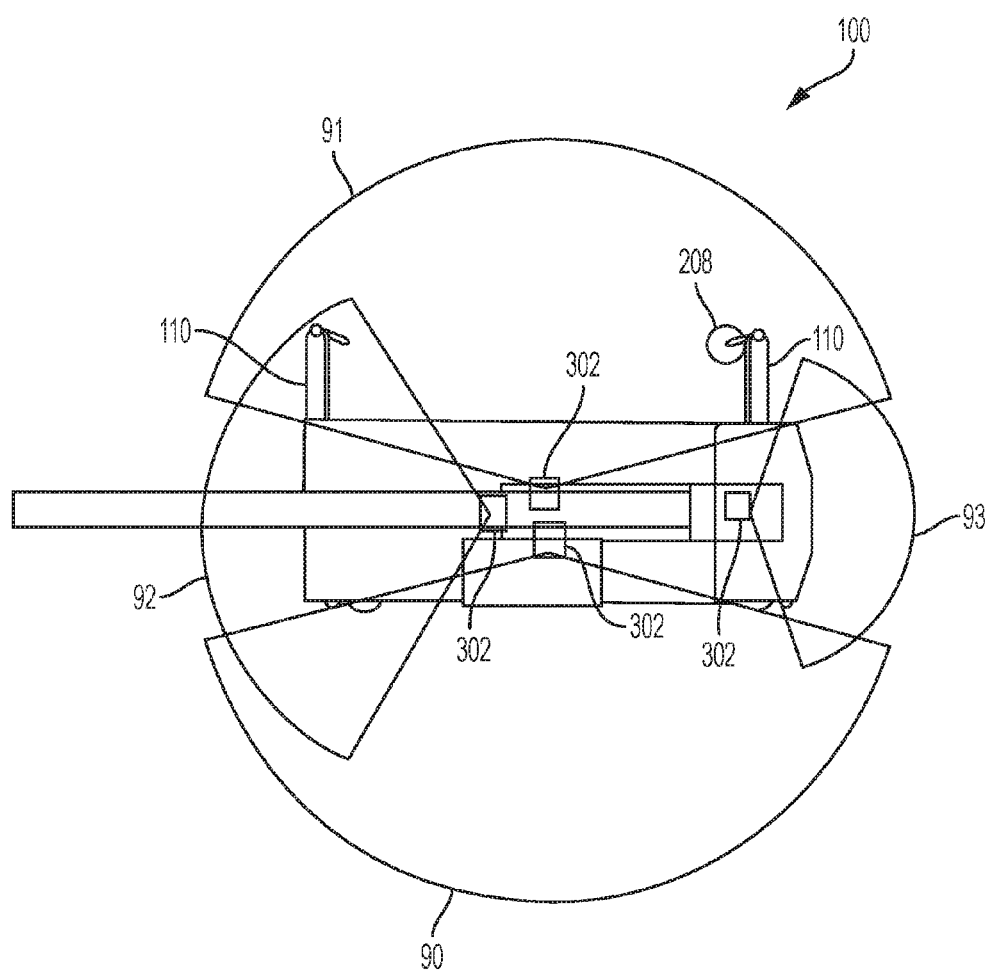
FIG. 18 illustrates an overhead schematic of a mobile crane showing the field of view of a plurality of cameras and an outrigger jack pad, according to an embodiment described herein.

Beyond detecting the position of the outrigger jacks 206, the system 300 would also allow for the detection of the placement of the outrigger pads 208 as illustrated in FIG. 18. In some instances, an outrigger pad 208 may fail to be attached to the outrigger jack 206. If the outrigger jack 206 were extended to contact the ground without a pad 208 it is likely that the outrigger jack 206 would sink or otherwise penetrate the base surface resulting in a loss of stability. The outrigger pad 208 can be detected in similar manners as above with the end of the outrigger detection. Once located, the system can determine if it is mounted to the end of the outrigger jack 206. If not, the system can signal a warning to the operator that the crane setup is not correct. The outrigger pad 208 may be painted with a contrasting color to help with detection.

Figure 19:
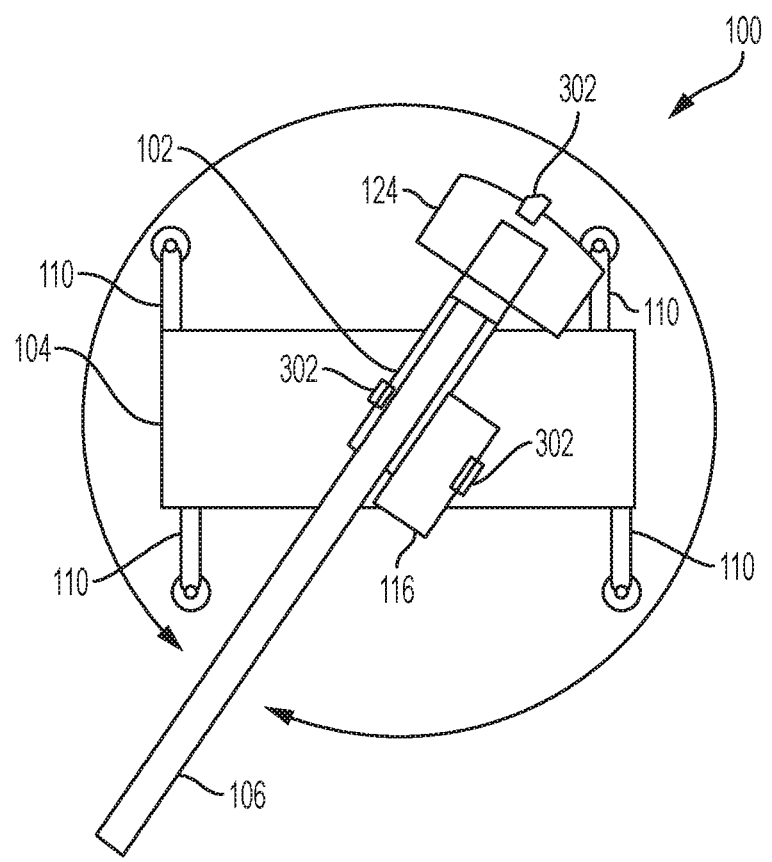
FIG. 19 illustrates an overhead schematic of a mobile crane showing the slewing of a crane superstructure, according to an embodiment described herein.

In the embodiment illustrated in FIG. 19, a camera assembly 302 may be used to detect the position of the superstructure 102 or other crane component. The superstructure 102 of the crane can rotate 360 degrees relative to the crane carrier 104 which is positioned on the ground either on outriggers or tires. This slew position is normally measured with a slew angle device. The slew angle device is typically electronic and provides an output proportional or indicative of the slew angle of the superstructure 102 relative to the carrier unit 104. In place of the slew angle device, the embodiment of FIG. 19 uses the camera assembly 302 to determine the slew angle of the superstructure 102. This can be from a single camera or from a plurality of cameras of one or more camera assemblies 302. The determined slew angle could be used as the only source for the slew angle or it could be used as a first or second source of the slew angle. Similar to the measurement of the outrigger extension, the image from the one or more camera assemblies 302 may be converted to a value and compared to a table of values to determine the slew angle position of the superstructure 102. Further, it is understood that with the superstructure 102 in a position as shown in FIG. 19, i.e., rotated away from a front of the carrier unit 104, the camera assemblies 102, for example, one or more of the first, second and third camera assemblies 304, 306, 308 may detect the presence or position of various outrigger components, such as the outrigger pad 208 or extension of an outrigger jack 206.

In one embodiment, the one or more camera assemblies 302 may be mounted to the superstructure 102 and/or carrier unit 104 and are configured to detect positions on the other of the superstructure 102 and carrier unit 104 to determine a position of the superstructure 102 relative to the carrier unit 104. Multiple images may be captured by a plurality of camera assemblies 302 detecting different positions on the superstructure 102 and carrier unit 104 to determine the position the of the superstructure 102 relative to the carrier unit 104.

In other embodiments, the system may compare a live image from at least one camera assembly 302 to a set of stored images to determine the slew position. For example, an image may be stored for varying positions of the superstructure 102 and each of these images may be compared against the current, live image. Image recognition may be used to determine the saved image most similar to the live image and a position corresponding to the most similar image is determined to be the position of the superstructure 102.

In some embodiments, this system will be active whenever the mobile crane 100 is operational, displaying usable data to the operator and or data to a load management system. In response to an operator instructing the outriggers 110 to extend, the system 300 will focus a display and computation towards that outrigger 110. The system 300 may display the outrigger position based on methods previously described. In embodiments including object detection, the system 300 simultaneously checks the path of the outrigger 110 to ensure it is clear for the outrigger to keep extending. If the system 300 detects that the path is not clear, the operator is notified and the outrigger 110 ceases to extend. In one embodiment, the system 300 communicates with the crane control system 117, or directly with a controller of the outrigger 110 to cease movement. Movement around the crane 100 may also be monitored and potential hazards will be outlined for the operator. If the hazard is not imminent, then the hazard will be observed. However, if the hazard is determined to be in a projected travel path for a crane component, or possibly interfere with crane operation, certain crane functionality may be disabled to reduce the likelihood of interference.

Figure 20:
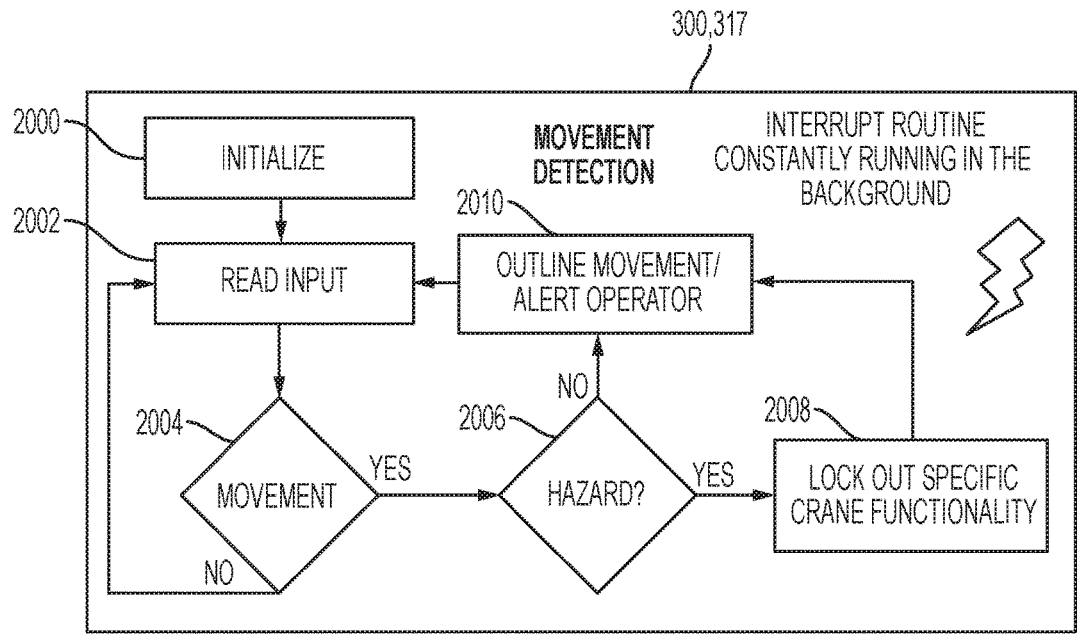
FIG. 20 illustrates a flowchart of a method for detecting movement using the visual outrigger monitoring system, according to an embodiment described herein.
Figure 21:
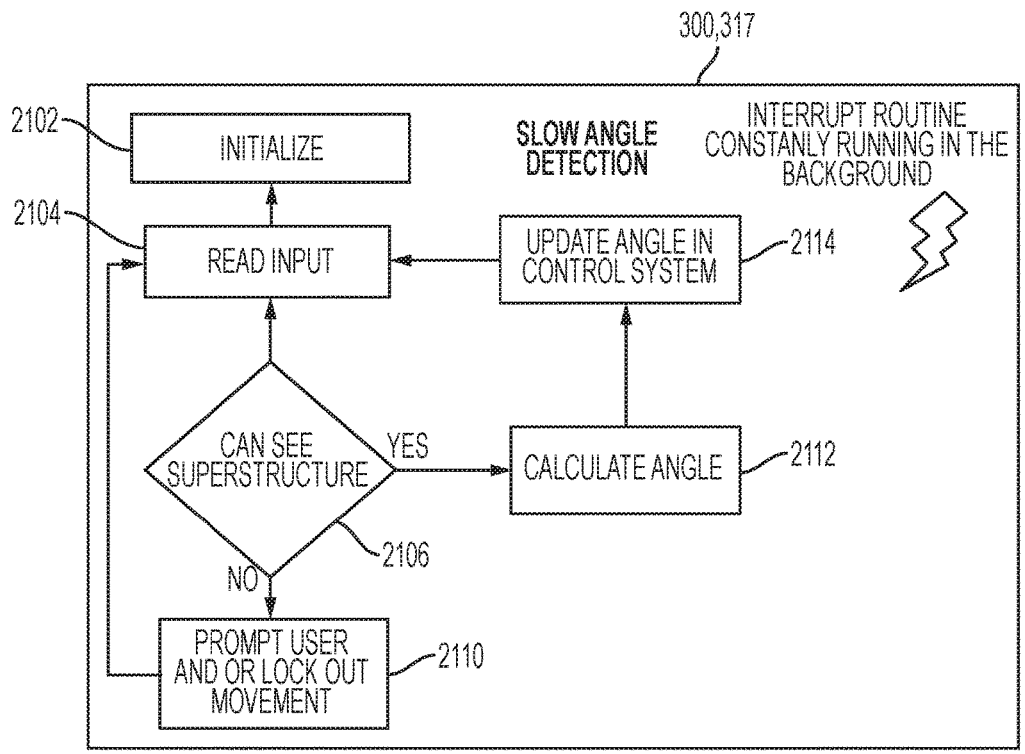
FIG. 21 illustrates a flowchart of a method for detecting a slew angle of a superstructure using the visual outrigger monitoring system, according to an embodiment described herein.
Figure 22:
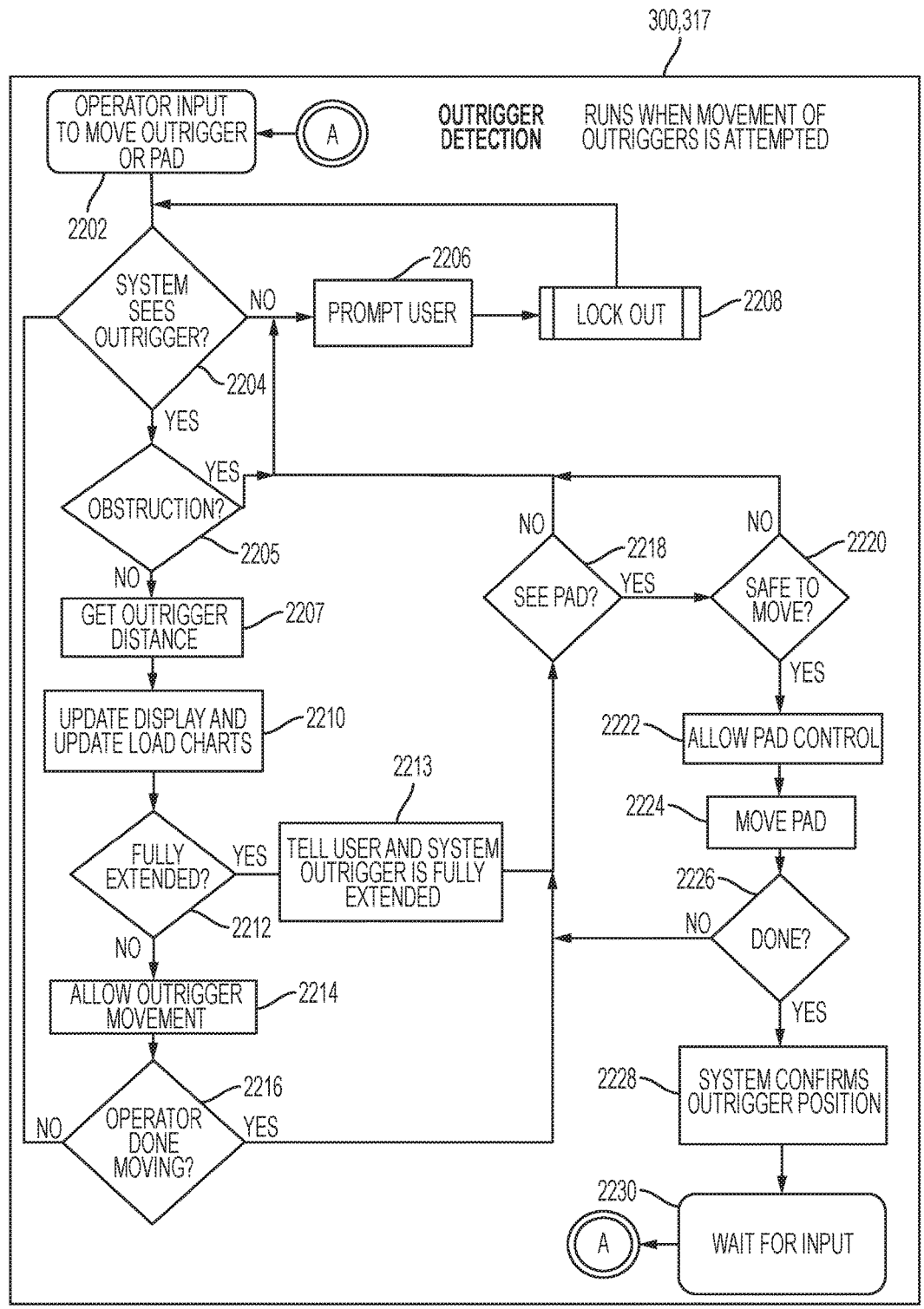
FIG. 22 illustrates a flowchart of a method for detecting the position of an outrigger using the visual outrigger monitoring system, according to an embodiment described herein.

FIGS. 20, 21, and 22 illustrate methods for monitoring a crane using the described systems. These methods may operate individually depending on the configuration of the mobile crane 100, or in some embodiments they may be operated simultaneously. FIG. 20 illustrates a process for detecting movement using the described systems. FIG. 21 illustrates a process for detecting the slew angle of the mobile crane upper works. FIG. 22 illustrates a process for outrigger detections.

In FIG. 20, the system 300 is initialized at block 2000 and an input is read from the one or more camera assemblies 302 at block 2002. In decision block 2004, the input is monitored for detection of movement. If no movement is detected, the process returns to block 2002. If movement is detected, the process moves to block 2006 where the system 300 determines if the object is a hazard. If the object is determined to be a hazard, some functionality of the crane is locked out in block 2008. If the object is not a hazard, the operator is alerted at block 2010 and the system returns to reading the input of the one or more camera assemblies 302 at block 2002.

In FIG. 21, the system 300 is initialized at block 2102. At block 2104, an input from the one or more camera assemblies 302 is read. At decision block 2106, if a camera assembly 302 can see the superstructure 102, a slew angle is calculated at block 2112. At block 2114, the calculated slew angle is updated in the control system 117 and the process returns to block 2104, where the input from the one or more camera assemblies 302 is read again. If the camera assemblies 302 cannot see the superstructure 102 at block 2106, then the crane operator is prompted and/or the movement of the superstructure 102 may be locked out at block 2110 and the process returns to block 2004 where the input from the camera assemblies 102 is read.

In FIG. 22 the process is triggered when movement of the outriggers 110 is detected at block 2202. At decision block 2204, the system 300 monitors the input from the one or more camera assemblies 302 to determine if a camera assembly 302 is able to see the outrigger 110. If not, at block 2206 the user is prompted and at block 2208 the system 300 locks out movement of the outrigger 110 if the outrigger 110 should be visible. If the outrigger 110 is visible at block 2204, the system 300 then determines if an obstruction exists in the path of the outrigger 110 at decision block 2205. If an obstruction exists, the process returns to step 2206 and the user is prompted. If there is no obstruction, the outrigger distance is determined at block 2207. At block 2210 the display and possibly a load chart is updated based on the determined outrigger distance. If the outrigger 110 is determined to be fully extended at block 2212, the operator and system are alerted that the outrigger 110 is fully extended at block 2213. If the outrigger 110 is not fully extended, the outrigger 110 is allowed to extend further in block 2214. If the operator is done moving the outrigger in block 2216, the process continues to decision block 2218, otherwise the process returns to block 2204.

At decision block 2218, the system 300 determines if it can see the outrigger pad 208 based on an input from the one or more camera assemblies 302. If not, the system 300 returns to block 2206 and the user is prompted. If the system 300 determines that it can see the outrigger pad 208, the system moves to block 2220 where a decision is made as to whether it is safe to move the pad 208. If not, the process returns to block 2206 and the user is prompted. If it is safe to move the pad 208, in block 2222 control of the pad 208 is enabled and in block 2224 the pad is moved. At block 2226, if the pad 208 is determined to be in its final position, the system 300 confirms the outrigger position at block 2228, and waits for further input at block 2230. If the outrigger pad 208 is not in its final position, the process returns to block 2218.

The computational requirements for the system may exceed that provided in a conventional crane control system. In some embodiments, an external microcontroller/computer/microprocessor/Electronic Control Unit may be used in addition to, or in place of, a conventional crane control system. The system 300 may also include one or more Electronic Control Unit/s to process the images to extract the data from the surroundings and layer it with additional data. The data being sent to a Load Management System includes information such as the length of the outrigger, distance of outrigger pad to ground, detected hazards around the crane, slew angles and error/warning messages. It is understood that in the embodiments described herein, the various detections, determinations, calculations, conversions, comparisons and the like may be carried out at the control system 317 of the optical outrigger monitoring system 300 by way of program instructions stored in the memory 334 and executed by the processor 332 at the control system 317. Alternatively, individual camera assemblies 302 may include control systems configured to do the same.

In the embodiments above, the optical outrigger monitoring system 300 may be operably and communicably connected to the crane control system 117. The crane control system 117 can control movement of various crane components, such as the outriggers 110, including beam extension/retraction and jack extension/retraction, as well as boom extension/retraction and boom lifting/lowering. The crane control system 117 may also control slewing movement of the superstructure 102. In one embodiment, the crane control system 117 may control functionality of the various crane components, for example, by locking out functionality or moving a component without further operator input, based on input, such as determinations or instructions, received from the optical outrigger monitoring system 300. The crane control system 117 may also make determinations and control functionality of the various crane components based on, for example, images captured by the one or more camera assemblies 302 that are received at the crane control system 117.

The warnings described in the various examples above may be provided, for example, as an audio warning, visual warning, tactile warning or combinations thereof. An audio warning may include, for example, an alarm or buzzer. A visual warning may include, for example, a light, flashing light, a color, text or indicia displayed on a display screen, user interface or other interface within a viewing area of the operator, and/or a flashing color, text or indicia on the display screen, user interface or other interface within a viewing area of the operator. A tactile warning may include, for example, vibrating feedback in a control element used actuated by the operator to control movement of a crane device, such as a joystick, for example.

Further, it is understood that the optical outrigger monitoring system described herein may be implemented as part of a larger control or monitoring system, such that the camera assemblies described in the embodiments above may monitor not only the outriggers, but also any number of other crane components as well.

It should be understood that various changes and modifications to the presently described embodiments herein may be made and that the described embodiments may be combined with one another. For example, the system may detect the outrigger extension individually, separate from the detection of an outrigger pad, or the detection may be combined. Similarly, embodiments of the system may detect an outrigger extension and include obstacle detection in a single unit. Such changes and modifications can be made without departing from the spirit and scope of the present invention and without diminishing its intended advantages. It is therefore intended that such changes and modifications be covered by the appended claims.

The invention claimed is:

1. An outrigger monitoring system, comprising:
a camera assembly configured to capture an image for monitoring a position of an outrigger; and
a control system operably and communicably connected to the camera assembly, the control system comprising a processor and computer readable storage media in communication with the processor, the computer readable storage media storing instructions that, when executed by the processor, cause the control system to implement functions comprising an image recognition function configured to receive the image from the camera assembly, detect an outrigger in the image, and determine an extension length of the outrigger based on the detected outrigger in the received image, wherein the functions further comprise an obstacle detection function configured to detect an object in a path of the outrigger based on the received image.

2. The outrigger monitoring system of claim 1, wherein the outrigger includes a target, and the image recognition function comprises a target recognition function.

3. The outrigger monitoring system of claim 2, wherein the target comprises one or more of an optical pattern on the outrigger and a high contrast color coating a portion of the outrigger.

4. The outrigger monitoring system of the claim 1, wherein the image recognition function comprises an edge recognition function to detect an edge of the one or more outriggers.

5. The outrigger monitoring system of claim 1, wherein the functions further comprise a motion detection function configured to detect motion in the field of view of the camera assembly.

6. The outrigger monitoring system of claim 1, wherein the outrigger is one of a plurality of outriggers, and the camera assembly monitors more than one outrigger of the plurality of outriggers.

7. The outrigger monitoring system of claim 6, wherein the camera assembly is one of a plurality of camera assemblies, each camera assembly configured to monitor more than one outrigger of the plurality of outriggers.

8. A crane comprising:
a carrier unit;
a superstructure mounted on the carrier unit;
at least one outrigger coupled to the carrier unit, the outrigger configured to extend and retract relative to the carrier unit; and
an outrigger monitoring system comprising:
a camera assembly configured to capture an image for monitoring a position of the at least one outrigger; and
a control system operably and communicably connected to the camera assembly, the control system comprising a processor and computer readable storage media in communication with the processor, the computer readable storage media storing instructions, that when executed by the processor cause the control system to implement functions comprising an image recognition function configured to receive the image from the camera assembly, detect the presence of the at least one outrigger in the image, and determine an extension length of the at least one outrigger based on the detected outrigger in the received image, and
a user interface, wherein the determined extension length of the at least one outrigger is displayed on the user interface.

9. The crane of claim 8, wherein the camera assembly is mounted to the superstructure.

10. The crane of claim 8, wherein the functions further comprise a function for determining a slew angle of the superstructure.

11. The crane of claim 8, wherein the camera assembly includes a first camera assembly mounted to the superstructure at a first position and a second camera assembly mounted to the superstructure at a second position.

12. The crane of claim 11, wherein the camera assembly further includes a third camera assembly mounted to the superstructure at a third position.

13. The crane of claim 11, wherein the at least one outrigger includes a first pair of outriggers and a second pair of outriggers, the first camera assembly configured to monitor the first pair of outriggers and the second camera assembly configured to monitor the second pair of outriggers.

14. The crane of claim 8, further comprising a jack coupled to a distal end of the at least one outrigger, wherein the functions further comprise a function for determining an extension of the jack.

15. The crane of claim 14, further comprising a jack pad coupled to the jack, wherein the functions further comprise a function for determining the presence of the jack pad.

16. A method of monitoring a crane outrigger, comprising:
causing a crane to extend an outrigger;
visually monitoring the outrigger by capturing an image of the outrigger with a camera assembly;
detecting the outrigger in captured image;
determining an extension length of the outrigger based on the detected outrigger in the captured image; and
displaying the determined extension length on a user interface.

17. The method of claim 16, wherein the outrigger has a target and wherein the extension length of the outrigger is detected by detecting the target.

18. The method of claim 16, wherein the extension length of the outrigger is detected using edge detection of the image of the outrigger.

* * * * *

UNITED STATES PATENT AND TRADEMARK OFFICE
CERTIFICATE OF CORRECTION

PATENT NO. : 10,544,012 B2
APPLICATION NO. : 15/416817
DATED : January 28, 2020
INVENTOR(S) : John R. Rudy et al.

Page 1 of 1

It is certified that error appears in the above-identified patent and that said Letters Patent is hereby corrected as shown below:

In the Specification

Column 4, Line 58, delete "media" and insert -- memory --, therefor.

Column 7, Line 3, delete "outriggers 102." and insert -- outriggers 110. --, therefor.

Column 12, Lines 5-6, delete "camera assemblies 102," and insert -- camera assemblies 302, --, therefor.

Column 13, Line 19, delete "camera assemblies 102" and insert -- camera assemblies 302 --, therefor.

In the Claims

Column 15, Line 19, Claim 4, delete "of the" and insert -- of --, therefor.

Signed and Sealed this
Seventh Day of July, 2020

Andrei Iancu
*Director of the United States Patent and Trademark Office*